United States Patent
Horii et al.

(10) Patent No.: US 6,851,500 B2
(45) Date of Patent: Feb. 8, 2005

(54) TWO-WHEELED VEHICLE-LOADABLE VEHICLE AND METHOD OF LOADING TWO-WHEELED VEHICLE ONTO VEHICLE

(75) Inventors: Yoshiyuki Horii, Saitama (JP); Yukinori Kurakawa, Saitama (JP); Satoshi Kazama, Saitama (JP); Hidetoshi Kabayama, Saitama (JP); Dai Higashida, Saitama (JP); Tomohiro Komori, Saitama (JP); Shoji Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/229,018

(22) Filed: Aug. 28, 2002

(65) Prior Publication Data

US 2003/0070855 A1 Apr. 17, 2003

(30) Foreign Application Priority Data

Sep. 3, 2001 (JP) .................................. 2001-266553
Sep. 28, 2001 (JP) .................................. 2001-304451

(51) Int. Cl.⁷ .............................. A61G 3/04; B60P 1/43
(52) U.S. Cl. .......................... 180/219; 414/467; 280/30
(58) Field of Search ................... 280/30, 496, 425.2; 180/219, 220, 221, 218, 16, 15, 11, 12; 414/339, 340, 334, 474, 475, 467

(56) References Cited

U.S. PATENT DOCUMENTS

| | | | | |
|---|---|---|---|---|
| 2,710,770 A | * | 6/1955 | Bareny | 296/193.03 |
| 3,390,896 A | * | 7/1968 | Philapy | 280/423.1 |
| 3,826,216 A | * | 7/1974 | Rhody | 440/12 |
| 4,289,212 A | * | 9/1981 | Immel | 180/19.1 |
| 4,921,390 A | | 5/1990 | Baines | |
| 5,072,805 A | | 12/1991 | Meiners | |
| 5,350,029 A | * | 9/1994 | Figueroa | 180/11 |
| 5,531,560 A | | 7/1996 | Bartholomew | |
| 5,591,056 A | * | 1/1997 | Patino | 440/12 |
| 6,053,555 A | * | 4/2000 | Neale | 296/65.03 |
| 6,247,741 B1 | | 6/2001 | Seel et al. | |
| 6,533,152 B1 | * | 3/2003 | Dischler | 224/413 |
| 2003/0038437 A1 | * | 2/2003 | Ungvari | 280/79.4 |

FOREIGN PATENT DOCUMENTS

| | | |
|---|---|---|
| DE | 92 03 898 U1 | 12/1992 |
| DE | 43 30 045 A1 | 3/1995 |
| DE | 43 41 183 A1 | 6/1995 |
| DE | 199 09 606 A1 | 9/2000 |
| DE | 198 54 365 C2 | 12/2000 |
| EP | 0 251 136 A1 | 1/1988 |
| GB | 2 009 056 A | 6/1979 |
| GB | 2 349 620 A | 8/2000 |
| JP | 7-228284 | 8/1995 |

* cited by examiner

Primary Examiner—Avraham Lerner
(74) Attorney, Agent, or Firm—Birch, Stewart, Kolasch & Birch, LLP

(57) ABSTRACT

A method of loading a two-wheeled vehicle onto a vehicle, e.g., within a trunk space of the accommodating vehicle. The required trunk space can be minimized without relying upon folding of the two-wheeled vehicle. A seat post of the two-wheeled vehicle loaded onto and rearward of a rearmost seat of a four-wheeled vehicle is pulled up forward around a predetermined shaft of pivotal motion. A seat of the two-wheeled vehicle functions integrally as a backrest of a rear seat of the four-wheeled vehicle and a seat back of the two-wheeled vehicle integrally functions as a headrest of the seat of the four-wheeled vehicle.

17 Claims, 40 Drawing Sheets

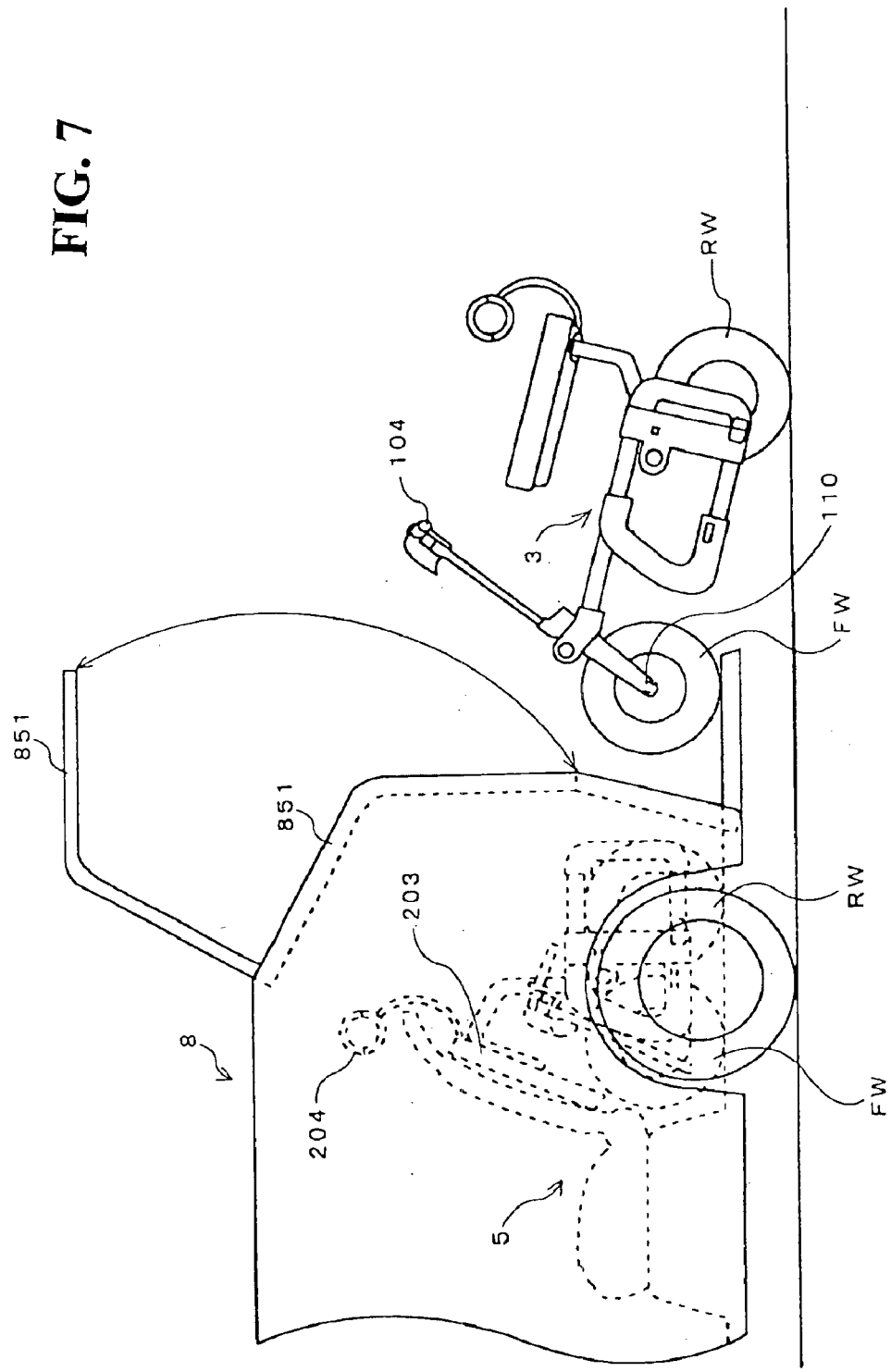

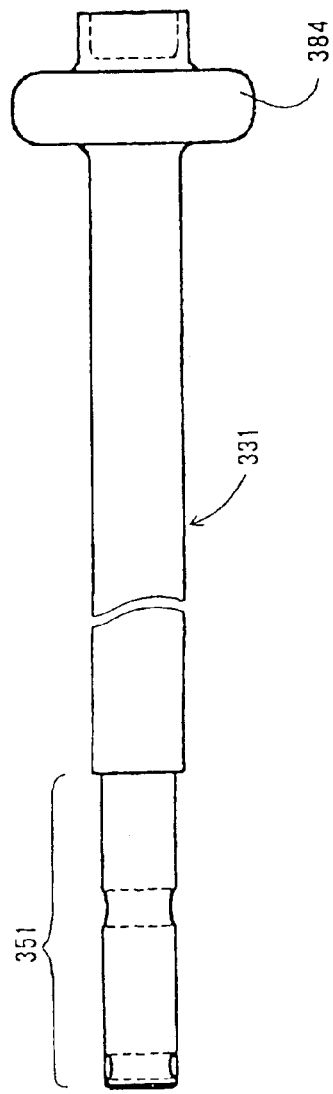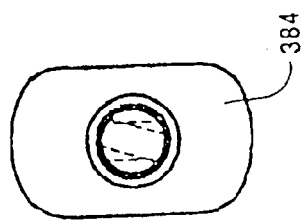

FIG. 15(a)
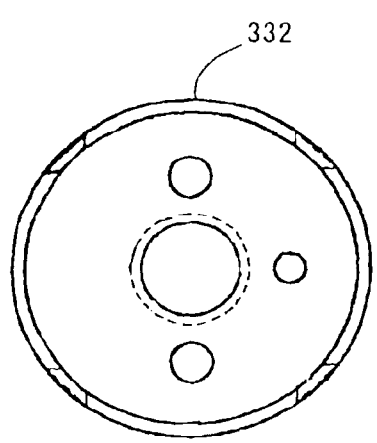
FIG. 15(b)
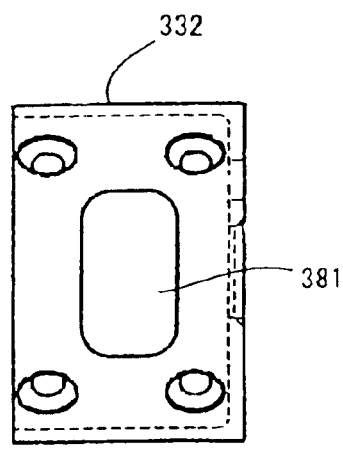
FIG. 16(a)     FIG. 16(b)     FIG. 16(c)
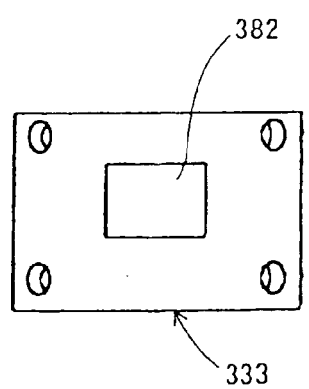 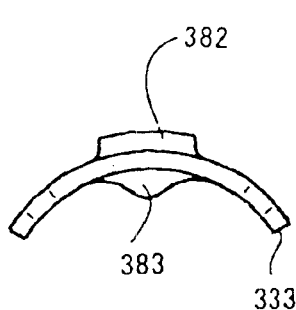 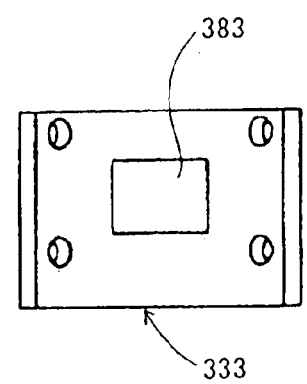

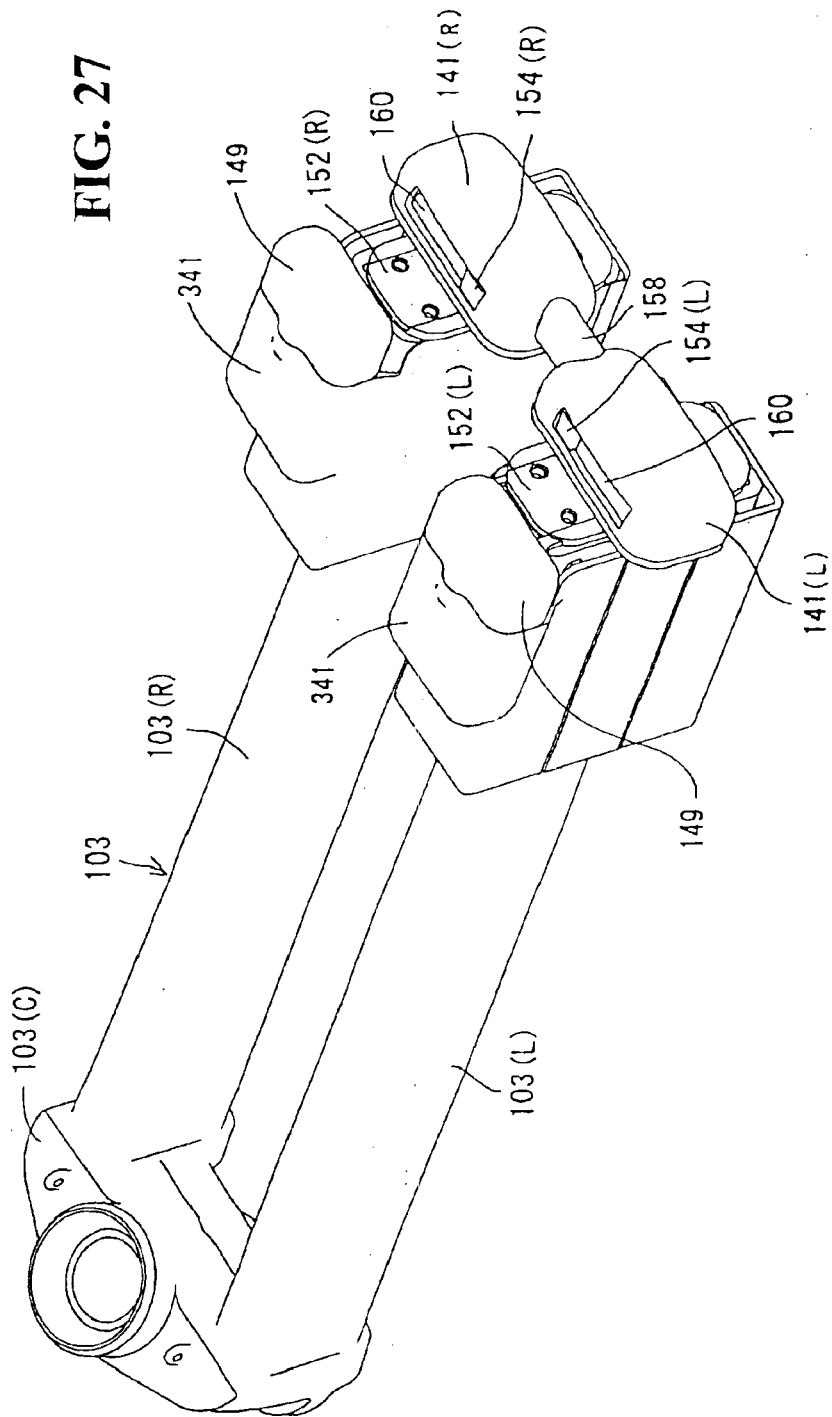

TWO-WHEELED VEHICLE-LOADABLE VEHICLE AND METHOD OF LOADING TWO-WHEELED VEHICLE ONTO VEHICLE

CROSS-REFERENCES TO RELATED APPLICATIONS

This non-provisional application claims priority under 35 U.S.C. § 119(a) on Patent Application No. 2001-266553 filed in Japan on Sep. 3, 2001, and Patent Application No. 2001-304451 filed in Japan on Sep. 28, 2001, the entirety of each of which are herein incorporated by reference.

BACKGROUND OF THE INVENTION

Field of the Invention

The present invention relates to a two-wheeled vehicle-loadable vehicle and a method of loading a two-wheeled vehicle onto a vehicle, and more particularly to a two-wheeled vehicle-loadable vehicle and a method of loading a two-wheeled vehicle onto a vehicle suitable for use to load an motor-driven two-wheeled vehicle which can be accommodated in a contracted state in a forward and backward direction.

DESCRIPTION OF THE BACKGROUND ART

A method of loading a light vehicle, such as a two-wheeled vehicle or a three-wheeled vehicle, onto a four-wheeled vehicle has been proposed in the official gazette of Japanese Patent Laid-Open No. Hei 7-228284. The light vehicle adopts a drive system with a foot-operated lever eliminating a chain and is accommodated in a trunk of the heavier or larger vehicle in a state wherein it is contracted compact with a folded handle.

In order to achieve a compact contraction of a vehicle, a complicated folding mechanism is required. This type of compact contraction gives rise to an increase of the weight of the vehicle(s) and/or complication of the folding/assembly operation.

SUMMARY OF THE INVENTION

The present invention overcomes the shortcomings associated with the background art and achieves other advantages not realized by the background art.

An object of the present invention is to provide a two-wheeled, vehicle-loadable vehicle and a method of loading a two-wheeled vehicle onto a vehicle by which the occupation of a trunk space can be minimized without relying upon folding of the smaller, two-wheeled vehicle.

An object of the present invention is to provide a two-wheeled vehicle loaded on a larger vehicle that functions as part of the larger, e.g., four-wheeled, vehicle. Since the two-wheeled vehicle and the vehicle onto which the two-wheeled vehicle is loaded can use some of the same functioning components, a reduction of the space and reduction of the weight can be achieved without adopting a complicated folding mechanism.

One or more of these and other objects are accomplished by a two-wheeled vehicle for being loaded onto an accommodating vehicle, wherein a portion of the two-wheeled vehicle functions as an operable part of the accommodation vehicle.

One or more of these and other objects are further accomplished by a two-wheeled, vehicle loadable system for loading a two-wheeled vehicle into a trunk space of an accommodating vehicle, wherein a portion of the two-wheeled vehicle functions as an operable part of the accommodating vehicle.

One or more of these and other objects are further accomplished by a method of loading a two-wheeled vehicle onto an accommodating vehicle, the method comprising loading a two-wheeled vehicle onto the accommodating vehicle, wherein a portion of the two-wheeled vehicle integrally functions as a portion of the accommodating vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 7 is a view showing a method of loading the motor-driven, two-wheeled vehicle into the four-wheeled vehicle;

FIGS. 14(a) and 14(b) are front and side elevation views of a lock shaft of the present invention;

FIGS. 15(a) and 15(b) are front and side elevation views of a rubber case of the present invention;

FIGS. 16(a), 16(b) and 16(c) are front surface, side elevation and rear surface views of a lock rubber member of the present invention;

FIG. 27 is a view showing the operation element of the present invention in a locking state;

DETAILED DESCRIPTION OF THE PREFERRED EMBODIMENTS

Figure 1:
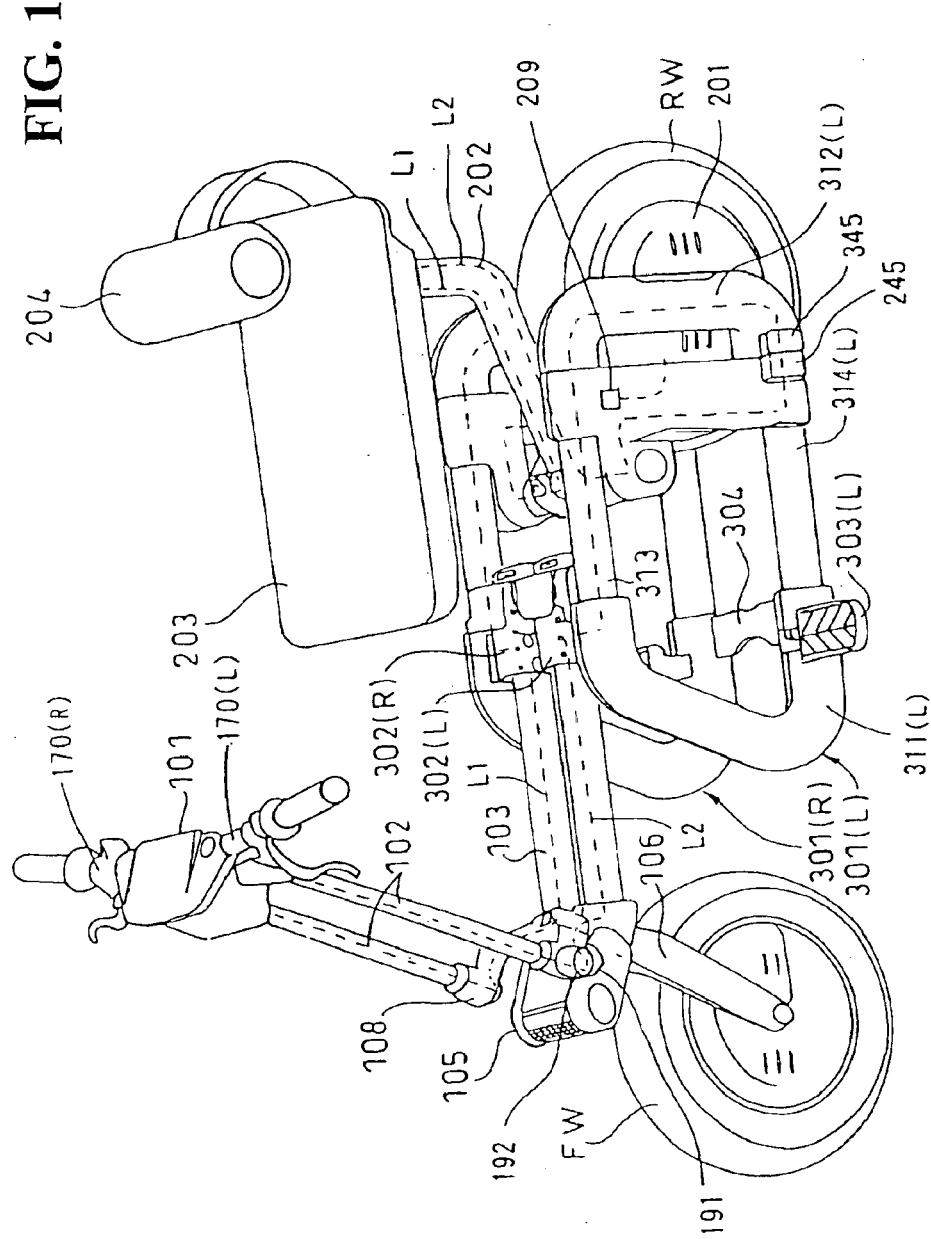
FIG. 1 is a perspective view of a motor-driven two-wheeled vehicle according to an embodiment of the present invention.
Figure 2:
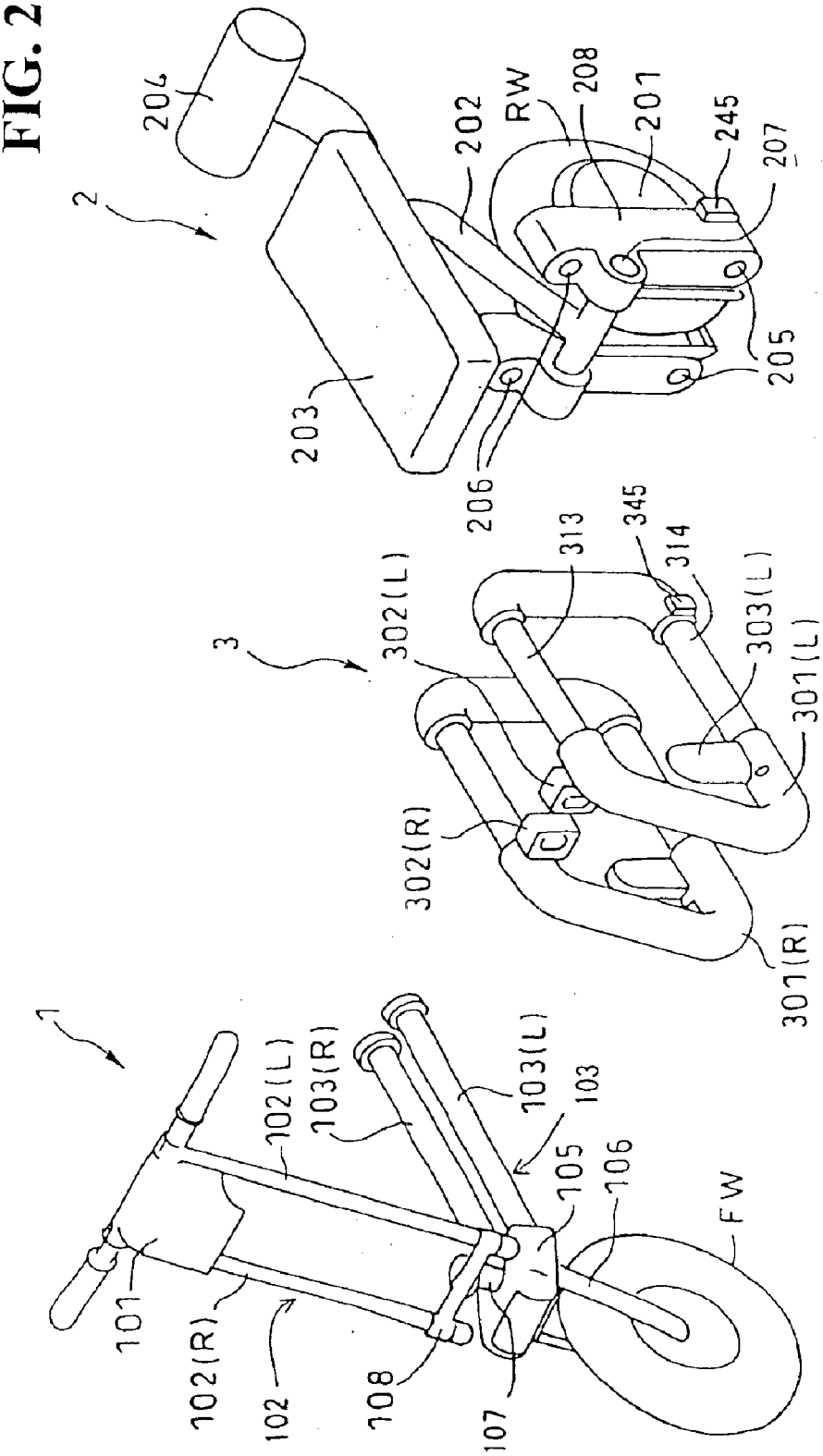
FIG. 2 is an exploded view showing a frame structure of the motor-driven two-wheeled vehicle of the present invention.

The present invention will hereinafter be described with reference to the accompanying drawings. In the following, a preferred embodiment of the present invention is described in detail with reference to the accompanying drawings. FIG. 1 is a perspective view of a motor-driven, two-wheeled vehicle of the contraction or collapsible, accommodation type according to an embodiment of the present invention. As shown in FIG. 2, the motor-driven two-wheeled vehicle includes a front frame 1 for supporting a front wheel FW and a steering mechanism for the front wheel FW, a rear frame 2 for supporting a rear wheel RW serving as a driving wheel and a driving mechanism for the rear wheel RW, and a center frame 3 for supporting the front and rear frames 1 and 2. The center frame 3 allows sliding movement in forward and backward directions so that the front and rear frames 1, 2 can be extended and contracted in the forward and backward directions.

The front frame 1 includes a front fork 106 for supporting the front wheel FW in a cantilever-like fashion from the left side, a handle bridge 108 connected to a handle post 107 provided at an upper end of the front fork 106, a pair of right and left handle shafts 102(R, L) supported for upward and downward sliding movement at the opposite ends of the handle bridge 108, a pair of right and left handle grips (R, L) split and fastened to upper ends of the handle shafts 102(R, L) and a meter unit 101 for supporting upper portions of the handle shafts 102(R, L) for a turning motion. A head pipe 103 of a tuning fork shape, including two head pipe shaft portions 103(R, L) extending rearwardly for supporting the front fork 106 for a steering motion, is also provided as shown.

The rear frame 2 includes a swing arm 201 for supporting the rear wheel RW, in which a drive motor is built, in a cantilever-like fashion from the left side. A swing shaft 207 for supporting the swing arm 201 for rocking motion, a seat post 202 supported for turning motion by the swing shaft 207, and a pair of left and right side components 208 for supporting the swing shaft 207 are also part of the rear frame 2. A seat 203 and a backrest 204 are attached to the seat post 202.

Each of the side components 208(R, L) has two openings 205 and 206 provided at upper and lower portions thereof and extending in the forward and backward directions therethrough. A secondary battery serving as a driving source and a control circuit are accommodated below the seat 203 as hereinafter described in detail. Connectors 245(R, L) of connector pairs for electrically connecting the rear frame 2 and the center frame 3 are provided on the opposite outer sides of the side components 208(R, L).

The center frame 3 includes a pair of right and left frame bodies 301(R, L) disposed in parallel to each other, and a pair of guide rollers 302(R, L) are secured to upper front portions of the frame bodies 301(R, L), respectively. A pair of steps 303(R, L) are provided at lower front portions of the frame bodies 301(R, L) such that they can be accommodated when they are pivoted upwardly. Connectors 345(R, L) for fitting or engaging with the connectors 245(R, L) of the connector pairs are provided on the opposite sides of rear portions of the frame bodies 301(R, L) for electrically connecting the center frame 3 and the rear frame 2.

In the configuration described above, the shaft portions 103(R, L) of the front frame 1 are inserted in openings of the guide rollers 302(R, L) of the center frame 3, and upper frame pipes 313 and lower frame pipes 314 of the center frame 3 are fitted in the openings 205 and 206 of the side components 208 of the rear frame 2. The battery is accommodated (refer to FIG. 37) below the seat 203 together with the control unit. Wiring lines L1 and L2, including a power supply line connected to the battery and a signal line connected to the control unit, are also provided. The wiring line L2 which is laid along the frame on the left side of the vehicle body is connected to the drive motor in the swing arm 201 through a switch 209 and extends into the center frame 3 through a pair of connectors 245 and 345.

Further, the wiring line L2 extends to the head pipe shaft portion 103(L) of the front frame 1 through a pair of connectors 161 and 162 (refer to FIG. 20) which are provided at rear ends of the guide roller 302(L) and the head pipe shaft portion 103(L) and fit with each other. Furthermore, the wiring line L2 is connected to the meter unit 101 through a pair of connectors 191 and 192 which are provided at an end of the handle shaft 102(L) and each of the opposite ends of the handle bridge 108.

Also the other wiring line L1 laid along the frame on the right side of the vehicle body extends into the center frame 3 and the front frame 1 in a similar manner except that it is not connected to the switch 209. Subsequently, a method of accommodation of the motor-driven, two-wheeled vehicle described above into a private four-wheeled vehicle is described in greater detail hereinafter. The motor-driven, two-wheeled vehicle of the present embodiment is accommodated in a state wherein the vehicle body thereof is contracted in the forward and backward direction in a trunk space secured rearwardly of a rearmost seat in the accommodating vehicle. The accommodating vehicle will be referred to hereinafter as either the larger vehicle, the accommodating vehicle or the four-wheeled vehicle, however, one of skill in the art will appreciate that the present invention is directed toward any vehicle that is loadable upon another vehicle. The height of the ceiling of the cabin continues to the rear of the vehicle, e.g., a so-called single-box car or two-box car.

Figure 3:
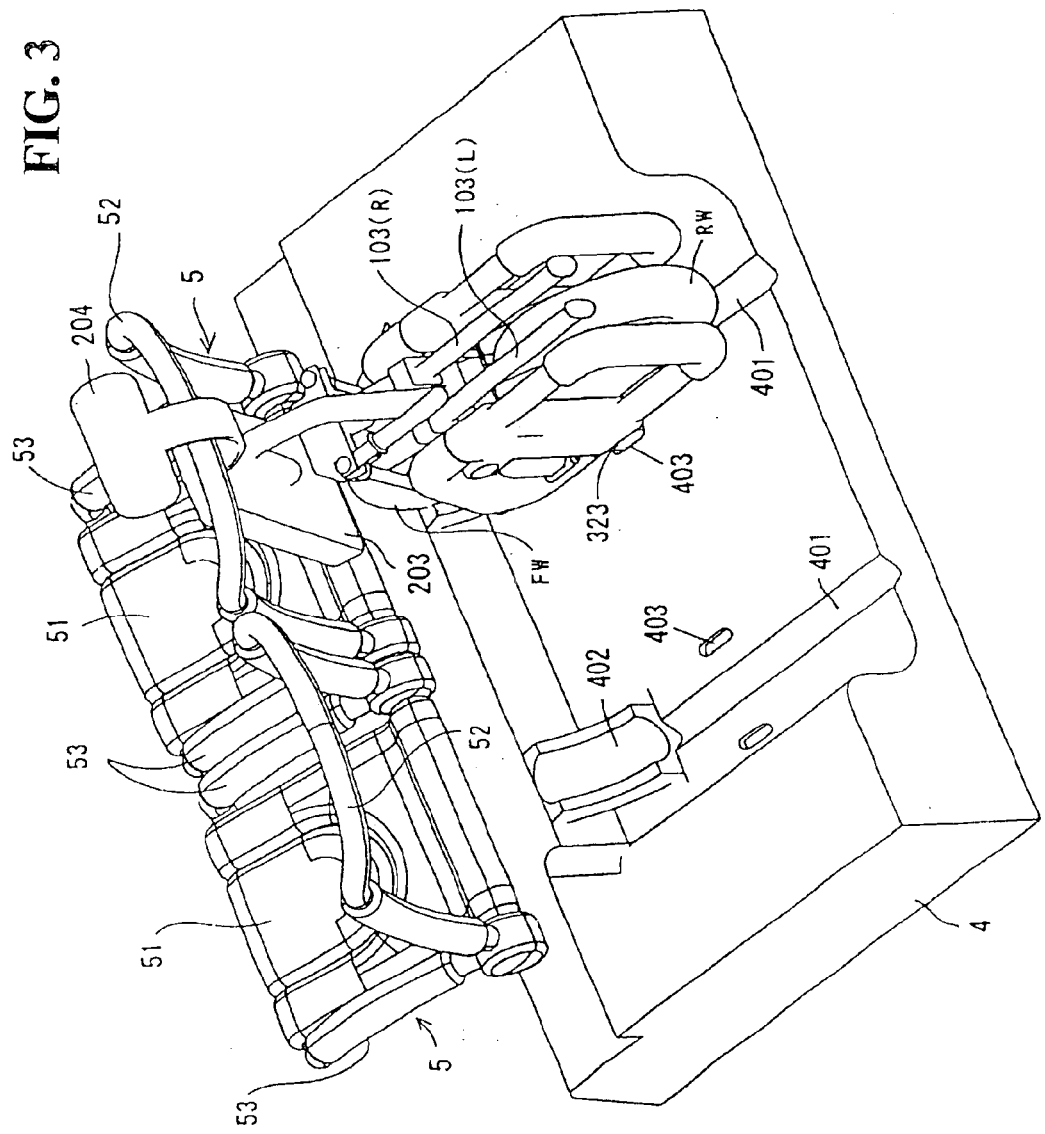
FIG. 3 is a perspective view of the motor-driven two-wheeled vehicle in a state wherein it is accommodated in a trunk space rearward of a rear seat of a larger vehicle as viewed from an upper, rearward position.
Figure 4:
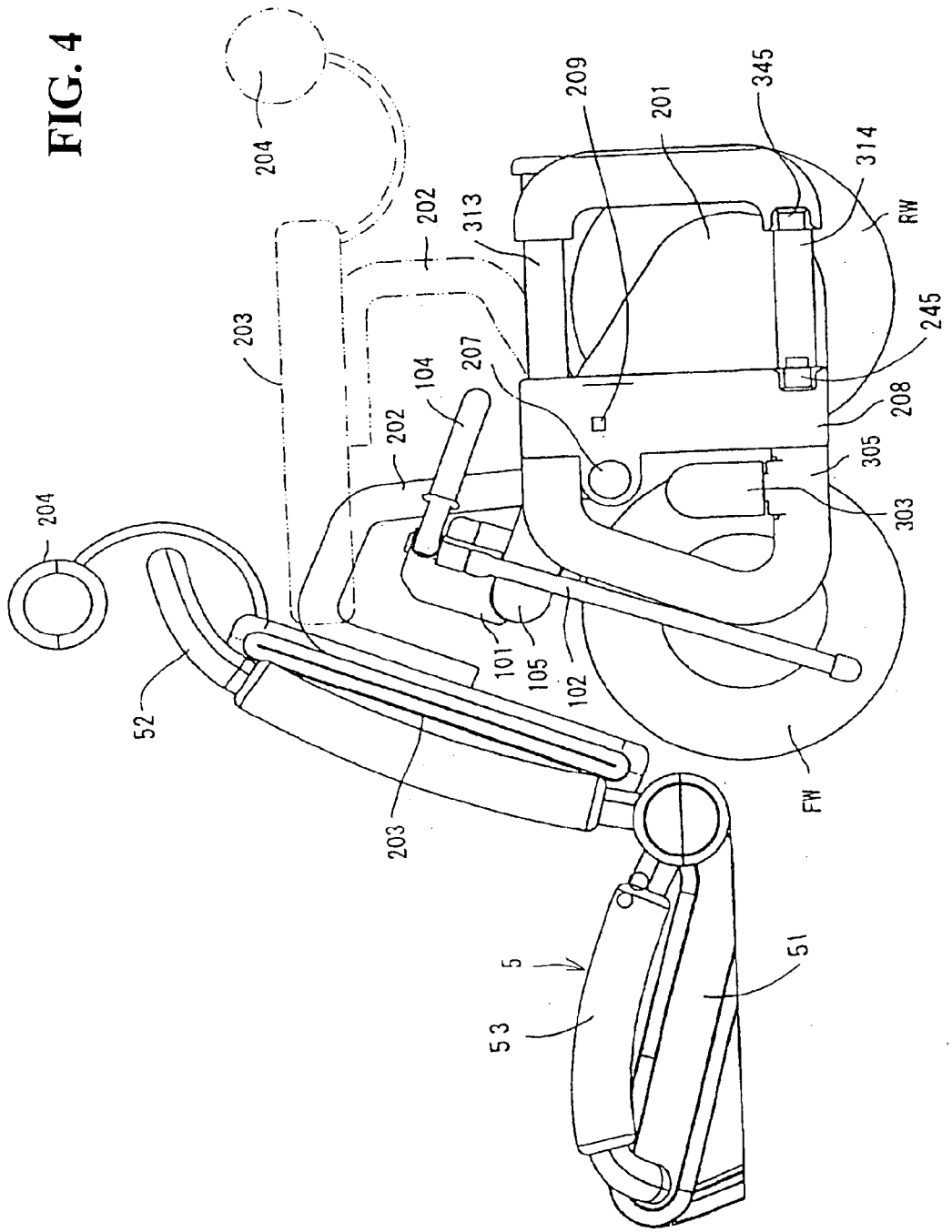
FIG. 4 is a side elevation view of the motor-driven two-wheeled vehicle in a state wherein it is accommodated in the trunk space rearward of the rear seat of the larger vehicle.
Figure 5:
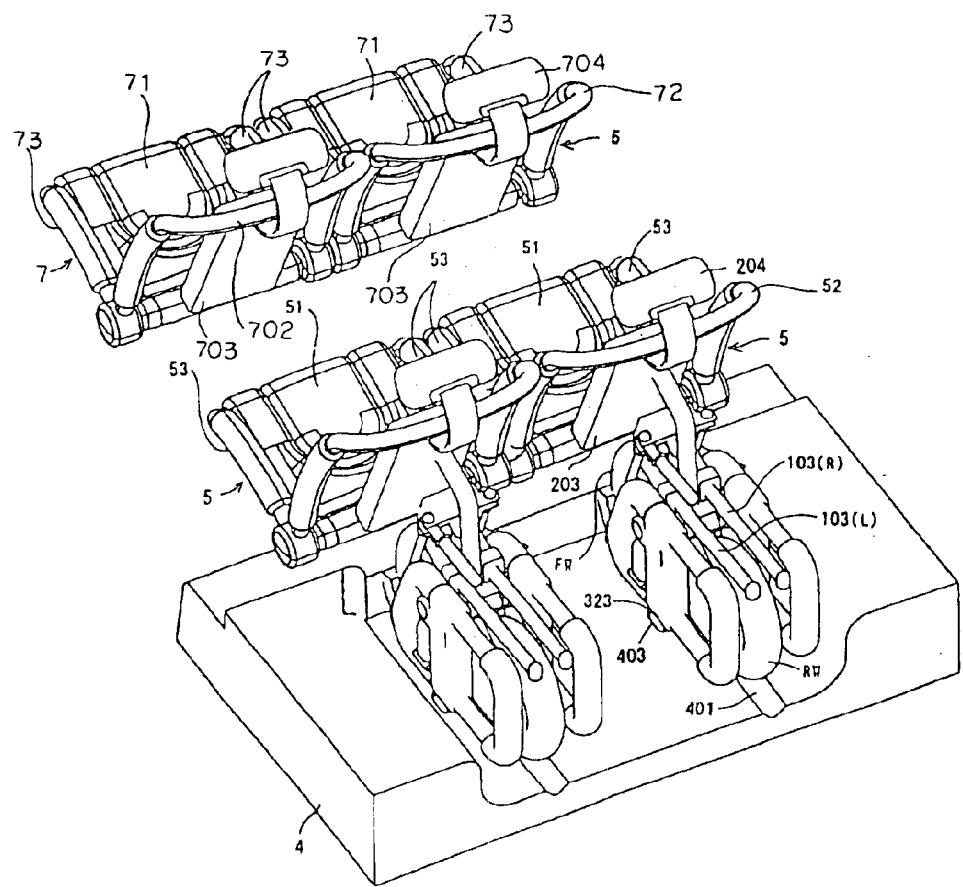
FIG. 5 is a view showing an arrangement wherein a pair of two wheeled vehicles are loaded behind a pair of front seats and a pair of rear seats.

FIG. 3 is a perspective view of the motor-driven, two-wheeled vehicle of the present embodiment accommodated in a trunk space rearward of a rear seat as viewed from a rear upper location on the left side of the vehicle. FIG. 4 is a side elevation view of the same. An accommodation panel 4 is incorporated in a trunk space secured rearward of rearmost seats 5 of the larger vehicle. In the present embodiment, two motor-driven two-wheeled vehicles can be accommodated in a leftward and rightward juxtaposed relationship. A wheel guide groove 401 and a wheel receiver 402 are provided at each of the left and right portions of the accommodation panel 4, respectively. One of skill in the art will appreciate that the present invention may include a single loadable vehicle, a pair of loadable vehicles, three loadable vehicles, etc. as desired and limited by the size and design of the larger vehicle.

Each of the rearmost seats 5 includes a seat bearing surface 51, a seat back frame 52, and a pair of hold bars 53 provided at the both sides of the seat bearing surface 51, and has a light-weighted structure without a backrest and a headrest provided therefore. With the rearmost seat 5, when the seat post 202 of the motor-driven, two-wheeled vehicle is accommodated within the larger vehicle and is pulled upward in a forward direction, the seat 203 functions as a backrest and the backrest 204 functions as a headrest for the rear seat(s) of the larger vehicle.

Further, in order to provide the seat design with consistency, the bearing surfaces 51 and 71 of the rear seats 5 and the other seats 7, seat back frames 52 and 72, and hold bars 53 and 73 are individually formed with a common design. Backrests 703 and headrests 704 attached fixedly to the other seats 7 are formed with a common design to the seats 203 and the backrests 204 of the two-wheeled vehicle, respectively. Consequently, the consistency of the design of the rearmost seats 5 and the design of the other forward seats 7 is assured in a state wherein the seat posts 202 of the two-wheeled vehicle accommodated in the trunk space are pulled up.

Figure 6:
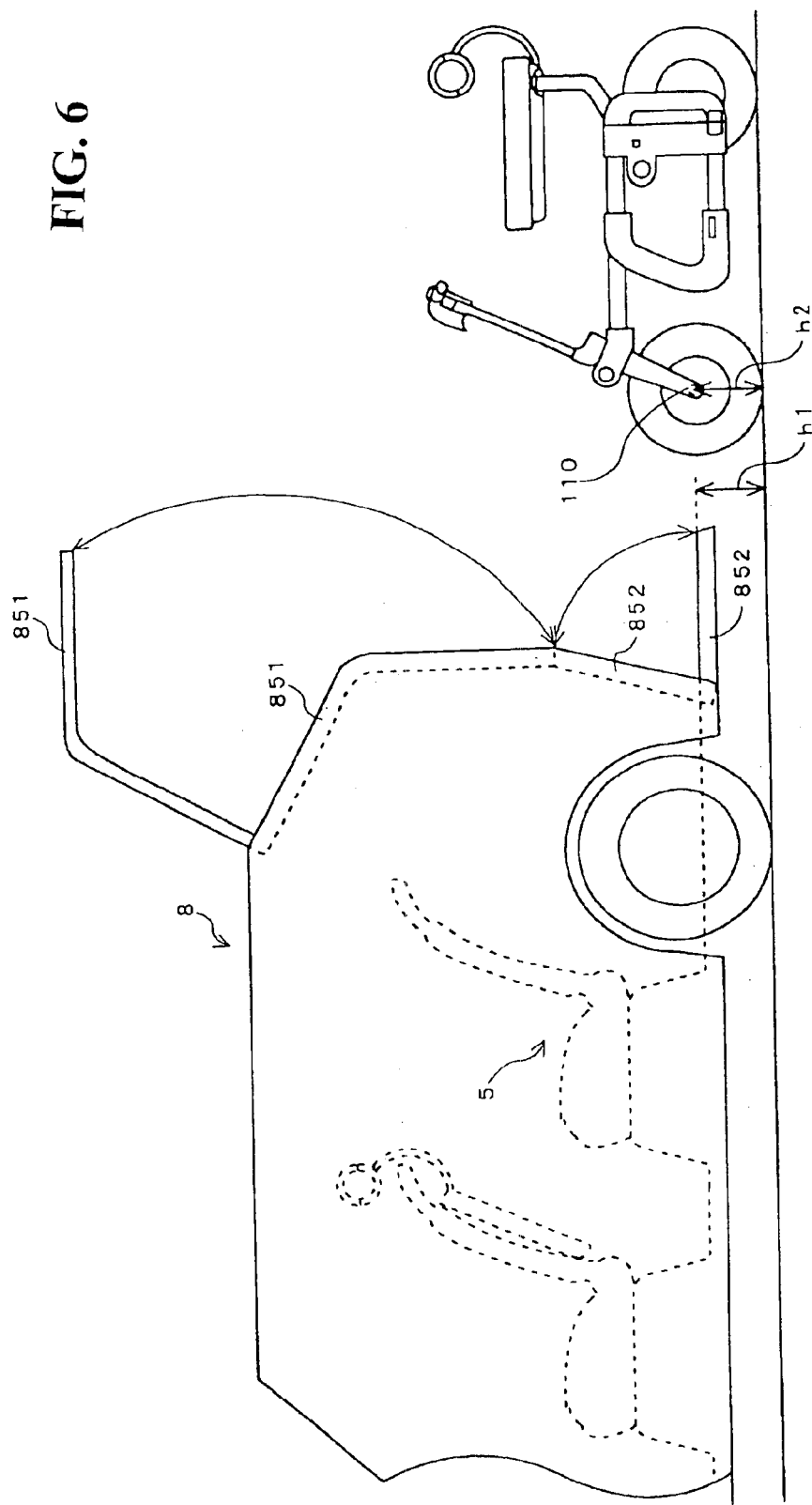
FIG. 6 is a view showing a method of loading a motor-driven, two-wheeled vehicle into a four-wheeled vehicle.

A method of loading the motor-driven, two-wheeled vehicle described above into the vehicle is described with reference to FIGS. 6 and 7. As shown in FIG. 6, a rear hatch of a vehicle 8 on which the motor-driven, two-wheeled vehicle is carried preferably has a two-door configuration including an upper hatch 851 which pivots upwardly and a lower hatch 852 which pivots open downwardly. The road clearance h1 of the lower hatch 852 in its open state is preferably equal to the axle height h2 of the motor-driven two-wheeled vehicle. In order to load the motor-driven two-wheeled vehicle into the trunk space, handle grips 104 may first be gripped to pull up the front wheel FW onto the lower hatch 852 as shown in FIG. 7. The rear wheel RW is then pulled up onto the lower hatch 852, or alternatively, the center frame 3 of the motor-driven two-wheeled vehicle may be gripped to lift the entire vehicle body and carry the vehicle into the trunk space.

Figure 8A:
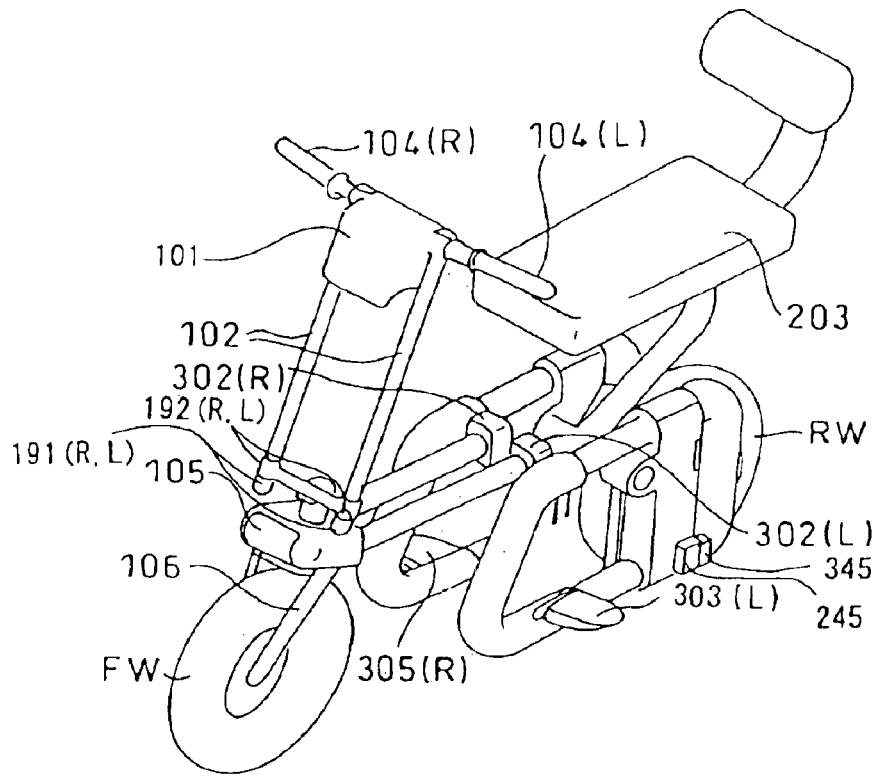
FIG. 8 is a view showing a method of contracting the motor-driven, two-wheeled vehicle of the present invention.
Figure 8B:
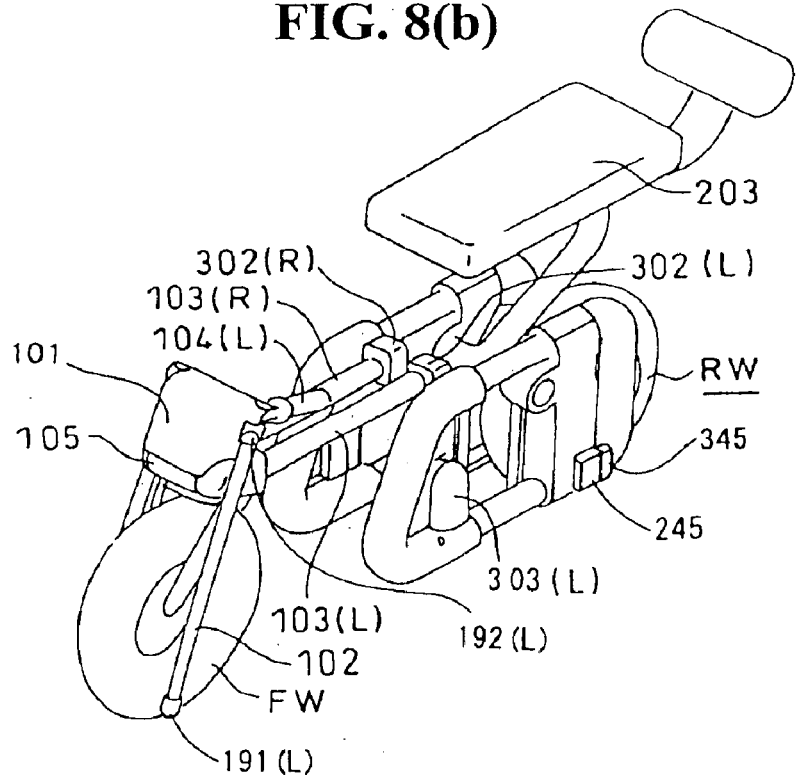

The method of accommodating the motor-driven, two-wheeled vehicle described above is subsequently described with reference to FIGS. 8 to 11. It is to be noted that only an outline of the accommodating operation is described, but the structure of the components for achieving the simple accommodation is hereinafter described in greater detail. FIG. 8(a) shows an extended state of the motor-driven two-wheeled vehicle, e.g., in a state in which the motor-driven vehicle can be operated. The front wheel FW is inserted into one of the wheel guide grooves 401 of the accommodation panel 4 until it abuts with the wheel receiver 402, and a handle lock is then released. Further, the left and right L-shaped handle shafts 102 are turned to the inner side by 90°, and the handle shafts 102 are pushed downwardly together with the meter unit 101 as shown in FIG. 8(b). Since the fitting engagement of the connectors 191(R, L) and 192(R, L) is cancelled and they are spaced away from each other, electric connection of the power supply/signal lines to the meter unit 101 and a headlamp unit 105 is cut.

Figure 9A:
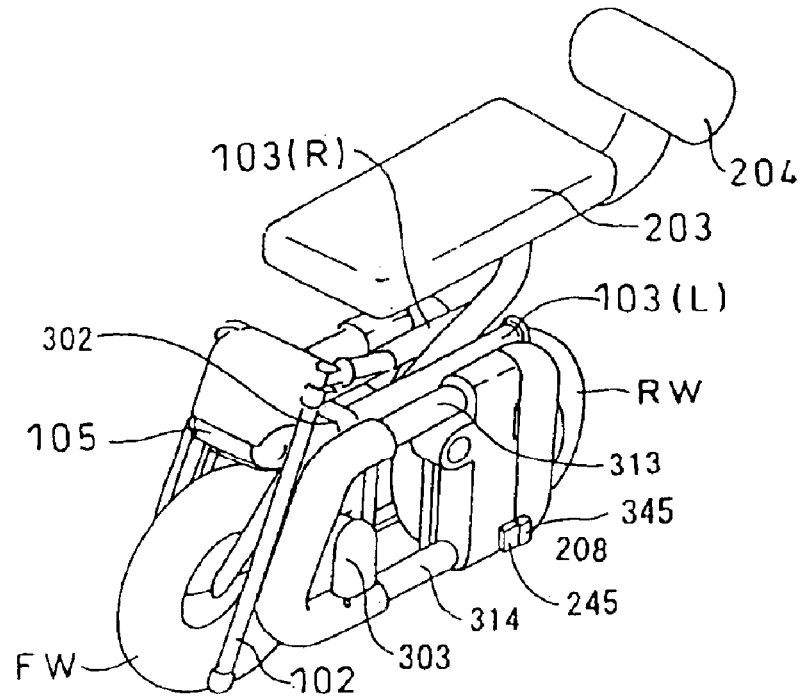
FIG. 9 is a view showing a method of contracting the motor-driven, two-wheeled vehicle of the present invention.

A front lock which is hereinafter described is released and the head pipe shaft portions 103(R, L) of the front frame 1 are retracted along the guide rollers 302 of the center frame 3 as shown in FIG. 9(a). Since the fitting engagement of the connectors 161 and 162 (refer to FIG. 20) for electrically connecting the front frame 1 and the center frame 3 is disengaged and the connectors 161 and 162 are spaced away from each other, the electric connection between the frames is cut.

Figure 10:
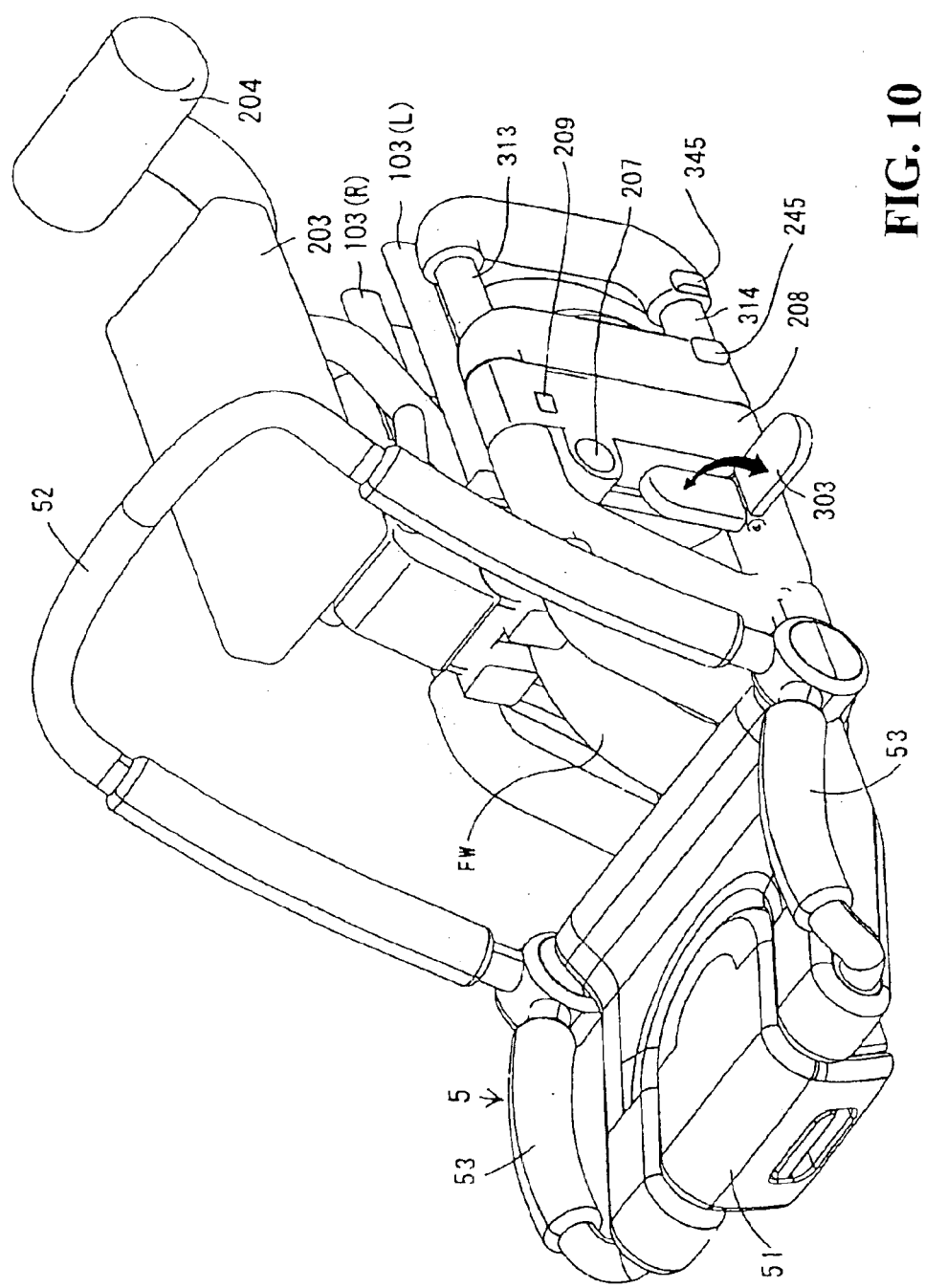
FIG. 10 is a view showing a method of accommodating the motor-driven two-wheeled vehicle behind a seat of another vehicle.

After a rear lock, which is hereinafter described, is released, the advancement switch 209 provided on one of the side components 208 is operated to cause the rear wheel RW to be driven at a low speed in the advancing direction so that the rear frame 2 is advanced as shown in FIG. 10. The direction of the frames is made coincident with the forward and backward direction of the four-wheeled vehicle so that the rear wheel RW may advance in the wheel guide groove 401. It is to be noted that the accommodation procedure into the four-wheeled vehicle is not limited to the foregoing example. Instead, the vehicle body may be carried onto the accommodation panel 4 of the trunk space while it is in a state wherein the handle shafts 102 are pushed down together with the meter unit 101 (FIG. 8(b)). The advancement switch 209 is then operated in a state wherein the front wheel FW is abutted with the wheel receiver 402. In this instance, the rear frame 2 and the center frame 3 advance simultaneously with respect to the front frame 1.

Figure 9B:
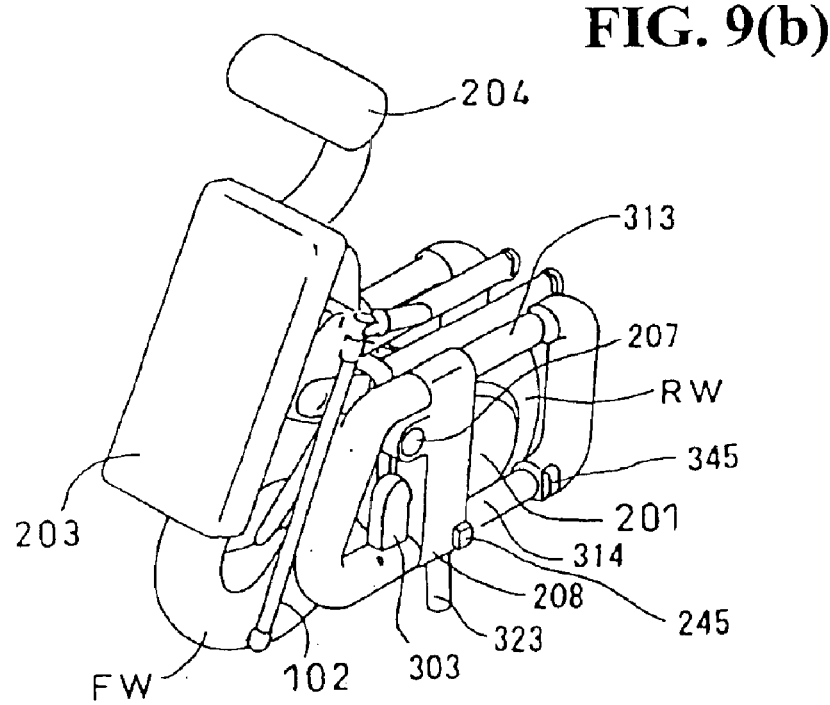
Figure 11:
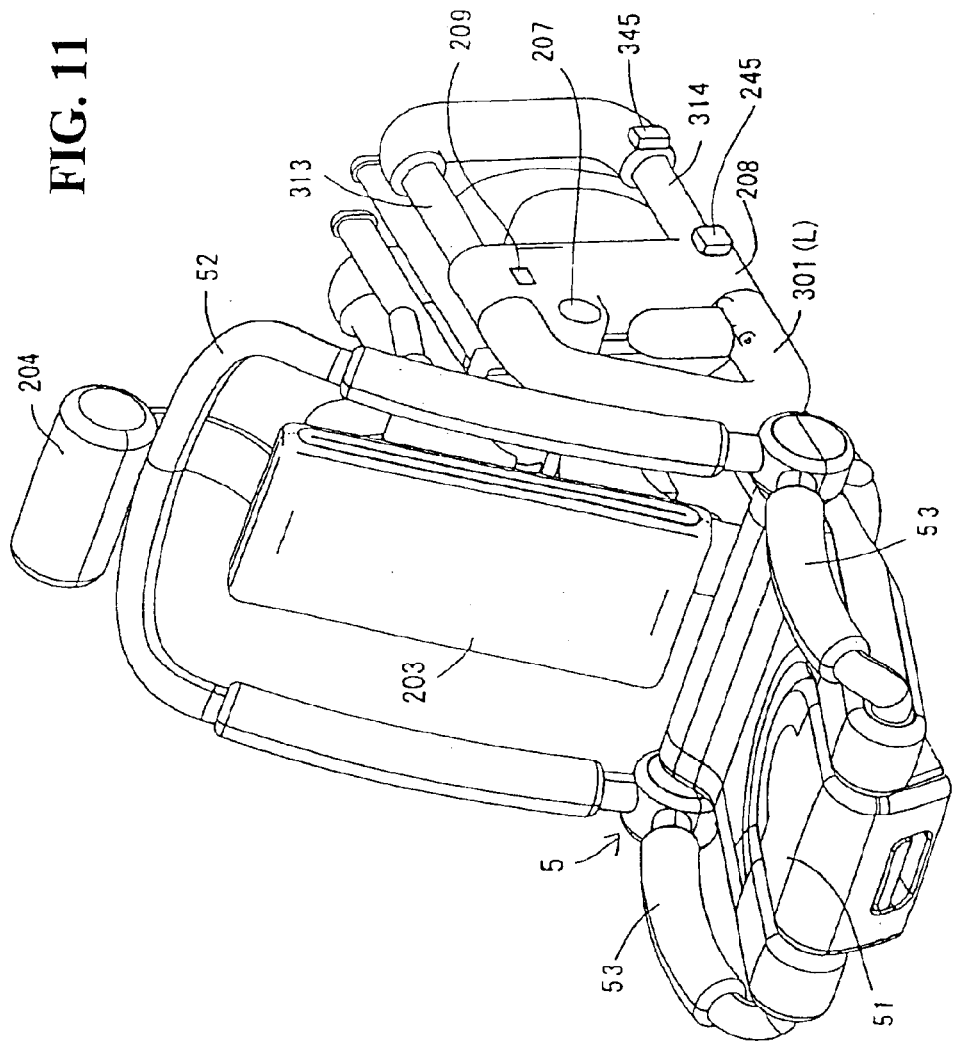
FIG. 11 is a view showing a method of accommodating the motor-driven two-wheeled vehicle.

After the contraction of the vehicle body is completed in such a manner as described above, the seat post 202 is pulled up around the swing shaft 207 as shown in FIG. 9(b) and FIG. 11, and the seat 203 and the backrest 204 are pivoted to integrally serve as the backrest position and the headrest position of the rearmost seat 5, respectively.

Since the two-wheeled vehicle includes the three frames 1, 2 and 3, and the front frame 1 and the rear frame 2 are mounted for sliding movement in the forward and backward directions with respect to the center frame 3, the overall length of the two-wheeled vehicle in its accommodation state can be reduced even further than possible with the background art. Since such further reduction in the forward and backward direction can be achieved, the two-wheeled vehicle can be accommodated in the trunk space of the larger vehicle 8 such that the forward and backward direction thereof coincides with the forward and backward direction of the four-wheeled vehicle. Accordingly, if the seat post 202 of the two-wheeled vehicle is pivoted, then the seat 203 and the backrest 204 thereof can integrally function as the backrest and the headrest of a rearmost seat 5, respectively.

Since the seat 203 and the backrest 204 of the motor-driven, two-wheeled vehicle accommodated in the trunk space of the four-wheeled vehicle function integrally as part of a rear seat of the vehicle, e.g., to achieve common usage for the functioning parts, a reduction in space and weight is achieved. Further, since electric connection between the components is cut in response to the operation for contracting the vehicle body frame, not only the operation upon the contraction is simplified, but an error or partial disconnection of the connections can be prevented.

In response to the turning operation of the swing shaft 207, a fastening element 323 which is hereinafter described in detail protrudes downwardly from the bottom of the side component of the center frame 3 and further through an opening 403 of the accommodation panel 4 as shown in FIG. 3 and FIG. 9(b) until it is connected to the other fastening element (not shown) provided on the vehicle body side. The fastening element 323 has an electric contact of a charging line provided thereon, and when the fastening element 323 is fastened to the other fastening element, the two fastening elements are mechanically fixed to each other. Charging current is simultaneously supplied from the power supply line of the vehicle side to the motor-driven two-wheeled vehicle side to charge the secondary battery of the motor-driven two-wheeled vehicle.

Figure 12:
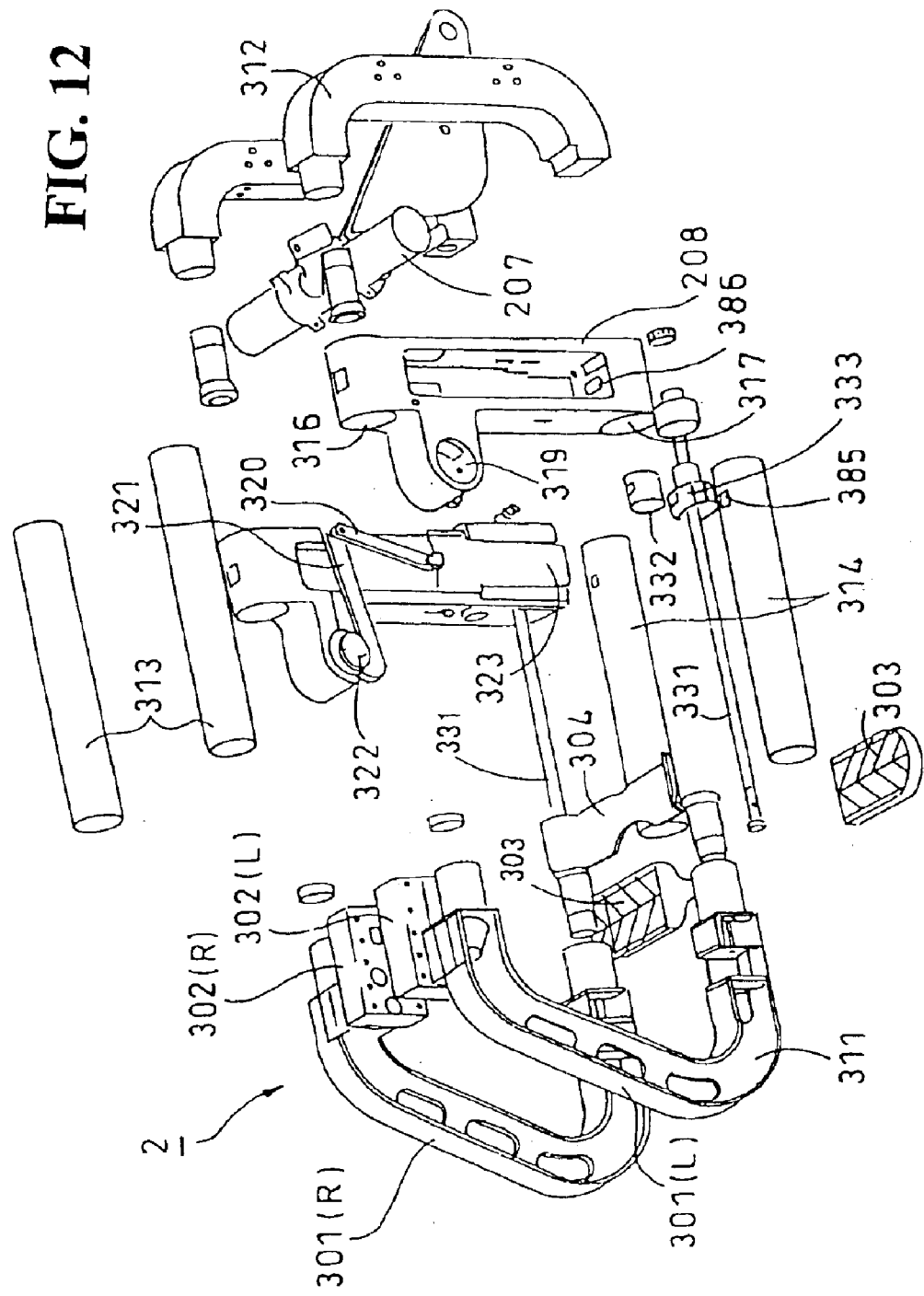
FIG. 12 is a view of a connection mechanism between portions of a center frame and a rear frame of the motor-driven, two-wheeled vehicle.
Figure 13:
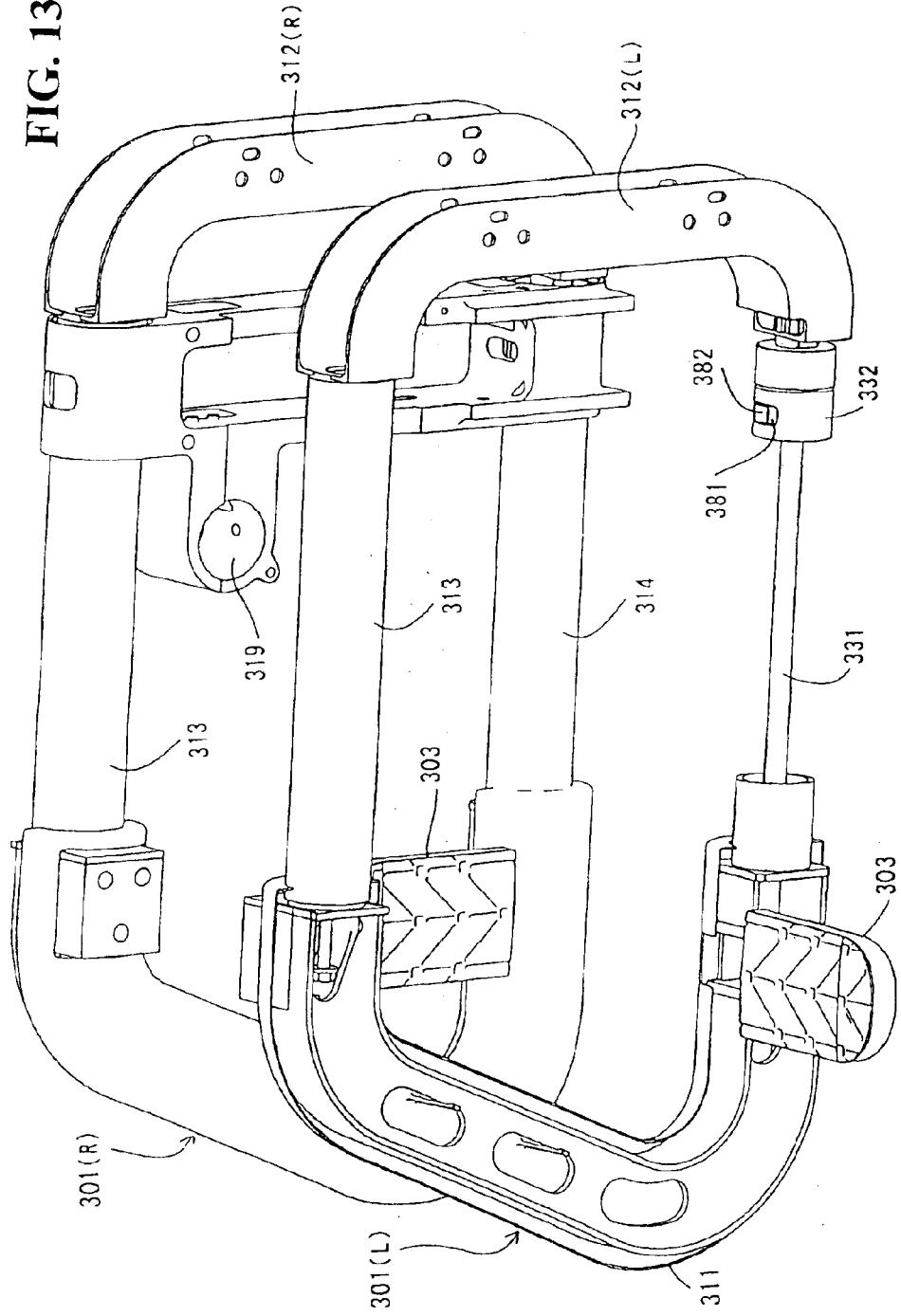
FIG. 13 is a view showing a support structure of the center frame of the vehicle of FIG. 12.

The structure of each of the frames 1, 2 and 3 and connection mechanisms thereof are described in greater detail hereinafter. FIG. 12 is an exploded view showing the center frame 3 and a connection mechanism of the center frame 3 to the rear frame 2. FIG. 13 is a view showing a support structure of the center frame 3. In FIGS. 12 and 13, common reference characters to those appearing hereinabove denote similar or corresponding elements.

The center frame 3 is formed, as described hereinabove with reference to FIG. 1, by connecting the pair of right and left frame bodies 301(R, L) disposed in parallel to each other at front lower portions thereof with a plate bridge 304. As shown in FIG. 13, each of the frame bodies 301 is formed by connecting a front body frame 311 and a rear body frame 312, each having a substantially U shape to each other with an upper frame pipe 313 and a lower frame pipe 314, and each forming a loop having a substantially trapezoidal shape.

Since, the center frame 3 is formed from the pair of right and left frame bodies 301(R, L) having a loop-like shape, not only the strength and the rigidity of the frame can be increased, but also the smaller frame and vehicle can be easily transported when it is carried on a vehicle or the like. A pair of right and left guide rollers 302(R, L) for supporting the head pipe 103 of the front frame 1 for sliding movement thereon are attached to upper portions of front portions of the frame bodies 301(R, L), respectively.

Each of the side components 208(R, L) of the rear frame 2 has two openings 316 and 317 (FIG. 12) provided at upper and lower portions thereof and extending in the forward and backward direction therethrough. The upper frame pipe 313 and the lower frame pipe 314 are fitted for sliding movement and advance in the openings 316 and 317, respectively. Consequently, the rear frame 2 is supported for sliding movement in the forward and backward directions with respect to the center frame 3. The swing shaft 207 is supported for rotation in the openings 319 formed in the side components 208(R, L) and extending in the leftward and rightward direction through the side components 208(R, L).

On side faces of the side components 208 which oppose to each other, fastening elements 323 connected to the swing shaft 207 through crank mechanisms 322, 320 and 321 are accommodated for upward and downward movement within a range defined by guide stoppers 324 and 325. Each of the fastening elements 323 is moved upwardly or downwardly in an interlocked relationship with a turning movement of the swing shaft 207 when the seat post 202 is pushed up as described hereinabove with reference to FIG. 3 and FIG. 9(b).

In this manner, since the two-wheeled vehicle and the four-wheeled vehicle are fastened to each other by the fastening element 323 in an interlocking relationship with a turning movement of the swing shaft 207, the necessity for a fastening operation is eliminated. In addition, a situation in which the two-wheeled vehicle remains separated from the four-wheeled vehicle can be prevented. Further, since an electric contact is provided on the fastening element 323 such that the battery of the two-wheeled vehicle is charged from the power supply of the four-wheeled vehicle through the fastening element 323, the battery can be charged while making use of a traveling time without specifically connecting a charging apparatus to the battery.

A rear lock mechanism for locking and unlocking sliding movement of the side components 208 to and from the lower frame pipe 314 in an interlocking relationship with a retracting movement of the step 303 is built in the lower frame pipe 314. The lock mechanism includes a lock shaft 331, a lock rubber member 333 and a rubber case 332 as principal components thereof, and the step 303 is used as an operating element for the lock mechanism.

FIG. 14(a) is a view showing a front elevation and FIG. 14(b) is a side elevation of the lock shaft 331. A small diameter portion 351 into which the step 303 is inserted is formed at a portion in the proximity of a front end portion of the lock shaft 331. A cam 384 is formed at a portion in the proximity of a rear end portion of the lock shaft 331. The lock shaft 331 is supported for rotation at the opposite ends thereof and is rotated in an interlocking relationship with a retracting movement of the step 303. The cam 384 lies horizontally when the step 303 is in its accommodated position, but stands uprightly when the step 303 is removed.

FIG. 15(a) is a view showing a front elevation and FIG. 15(b) is a side elevation of the rubber case 332. FIG. 16(a) is a view showing a front elevation, FIG. 16(b) is a side elevation and FIG. 16(c) is a rear elevation of the lock rubber member 333. The lock rubber member 333 is formed from a resilient member of an arcuate shape which is inscribed with the inner surface of the rubber case 332. The lock rubber member 333 has a front surface projection 382 and a back surface projection 383 provided at the center of the front and rear faces thereof. The lock rubber member 333 is securely mounted on the inner side of the rubber case 332 such that the front surface projection 382 thereof projects outwardly through an opening 381 of the rubber case 332.

Figure 17:
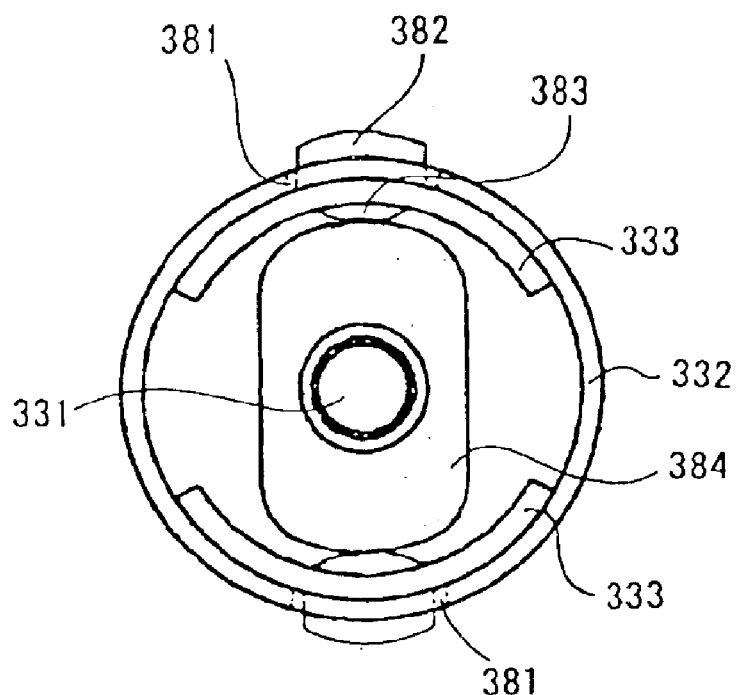
FIG. 17 is a side view of locking operation of a front lock mechanism of the present invention.
Figure 18:
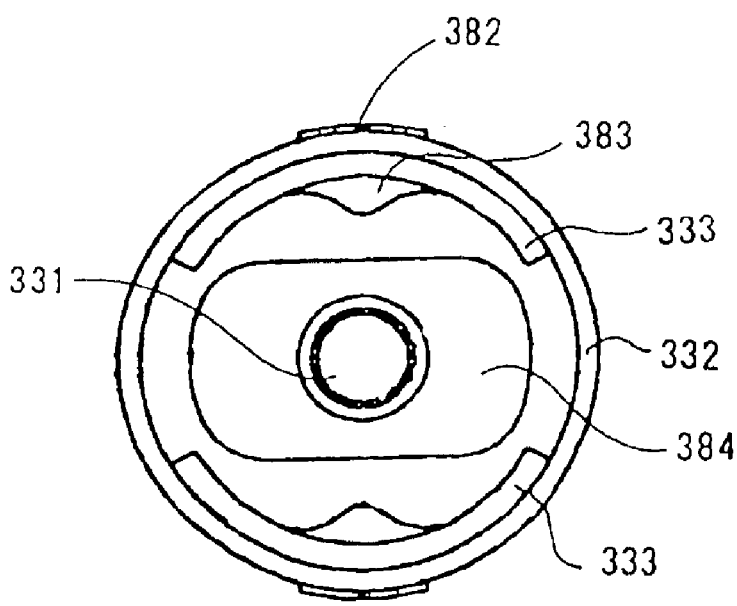
FIG. 18 is a schematic view of an unlocking operation of the front lock mechanism of the present invention.

FIGS. 17 and 18 are views showing a locking operation by the front lock mechanism of the components described above. In a state wherein the step 303 is removed, since the cam 384 assumes a posture wherein the longitudinal direction thereof is directed vertically as shown in FIG. 17, the back surface projections 383 of the lock rubber members 333 are pushed out by the opposite end portions of the cam 384. The front surface projections 382 thereof are projected outwardly by a comparatively great extent through the openings 381 of the rubber case 332. The projected front surface projections 382 extend through openings 385 (FIG. 12) of the lower frame pipe 314 and engage with openings 386 (FIG. 12) provided in the side component 208 to prevent sliding movement of the side component 208.

When the step 303 is in an accommodated state, since the cam 384 assumes a horizontal posture as shown in FIG. 18, the front surface projections 382 of the lock rubber members 333 are accommodated in the inside of the rubber case 332. Accordingly, sliding movement of the side component 208 along the lower frame pipe 314 is permitted. Since sliding movement of the rear frame 2 with respect to the center frame 3 is locked or unlocked in an interlocking relationship with a retracting operation of the steps 303, the necessity for a locking/unlocking operation for exclusive use is eliminated.

Figure 19:
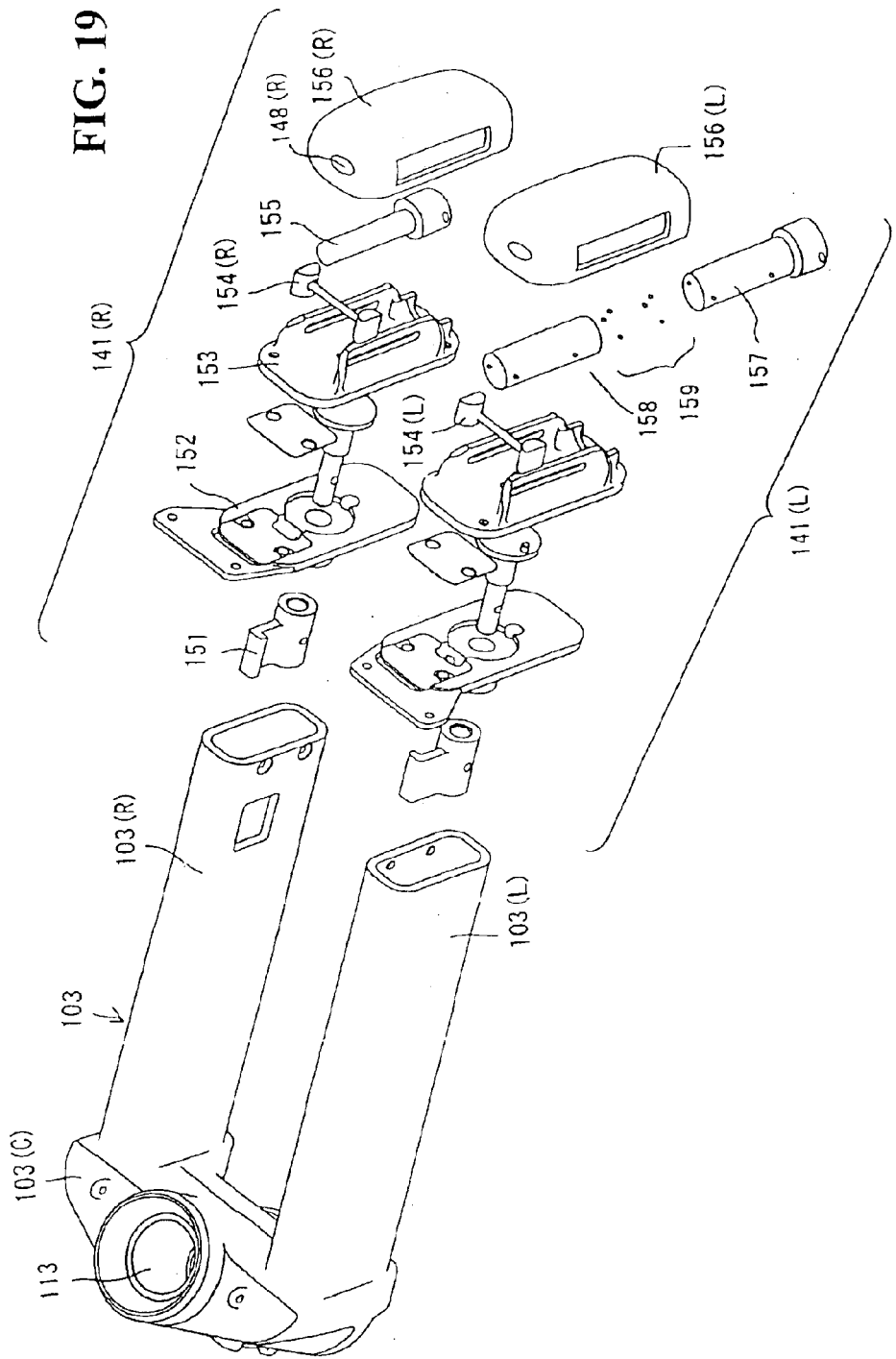
FIG. 19 is a view showing a configuration of a head pipe of the present invention.

Subsequently, a structure of the front frame 1 and a connection structure of the front frame 1 to the center frame 3 are described. FIG. 19 is an exploded view of the head pipe 103 of the front frame 1. The head pipe 103 includes a base portion 103(c) having a through-hole 113 formed therein for supporting the front fork 106 for steering movement, and a pair of right and left head pipe shaft portions 103(R, L) extending rearwardly and in parallel to each other from the base portion 103(c). The head pipe 103 in general has a shape similar to a tuning fork. Operation elements 141(R, L) of the front lock mechanism for inhibiting sliding movement of the front frame 1 relative to the center frame 3 in an extended state, e.g., in a traveling state of the two-wheeled vehicle are assembled to rear end portions of the head pipe shaft portions 103(R, L), respectively.

The operation element 141(R) includes a hook pipe 151, a base plate 152, a lever plate 153, a lever 154, an arresting pin 155 and a cover 156 as principal components. The other operation element 141(L) is different from the operation element 141(R) in that it includes, in place of the arresting pin 155, an engaging tube 160 which in turn includes an arresting inner tube 157, an arresting outer tube 158, and arresting balls 159 held between the arresting inner tube 157 and the arresting outer tube 158.

Figure 20:
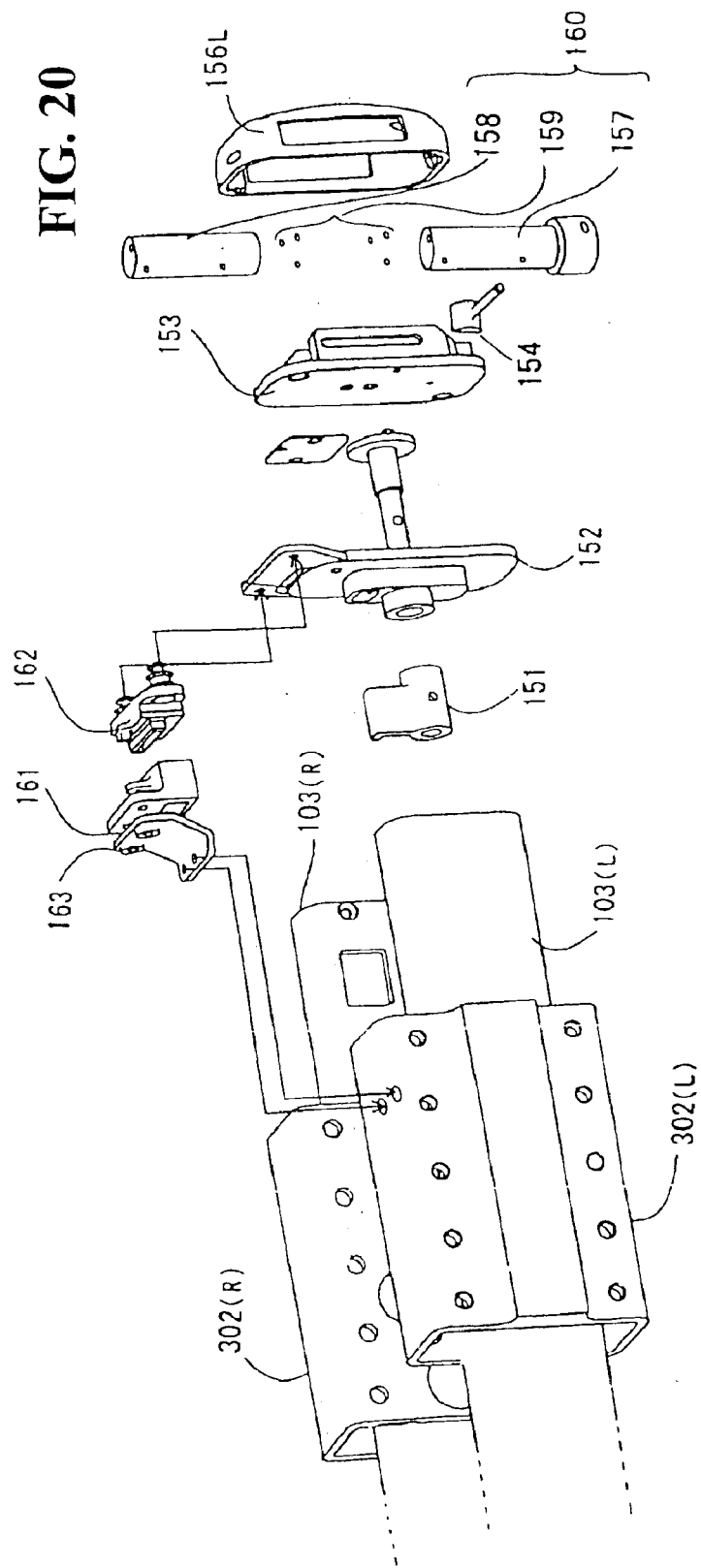
FIG. 20 is an exploded view showing the assembly of the head pipe.

In a process of manufacturing the two-wheeled vehicle, the head pipe shaft portions 103(R, L) are fitted into the guide rollers 302 of the center frame 3 in advance as shown in FIG. 20. The operation elements 141 are assembled thereafter to the rear end portions of the head pipe shaft portions 103(R, L). A male connector 162 and a female connector 161 for establishing electrical connection between the frames 1 and 2 upon contraction of the two-wheeled vehicle but electrically disconnecting them from each other upon extension of the two-wheeled vehicle are provided on each of the guide rollers 302 of the center frame 3 and each of the operation elements 141 of the front frame 1, respectively. The female connector 161 is securely screwed to an upper portion of the guide roller 302 through a mounting member 163. The male connector 162 is securely screwed to the base plate 152 of the operation element 141.

Figure 21:
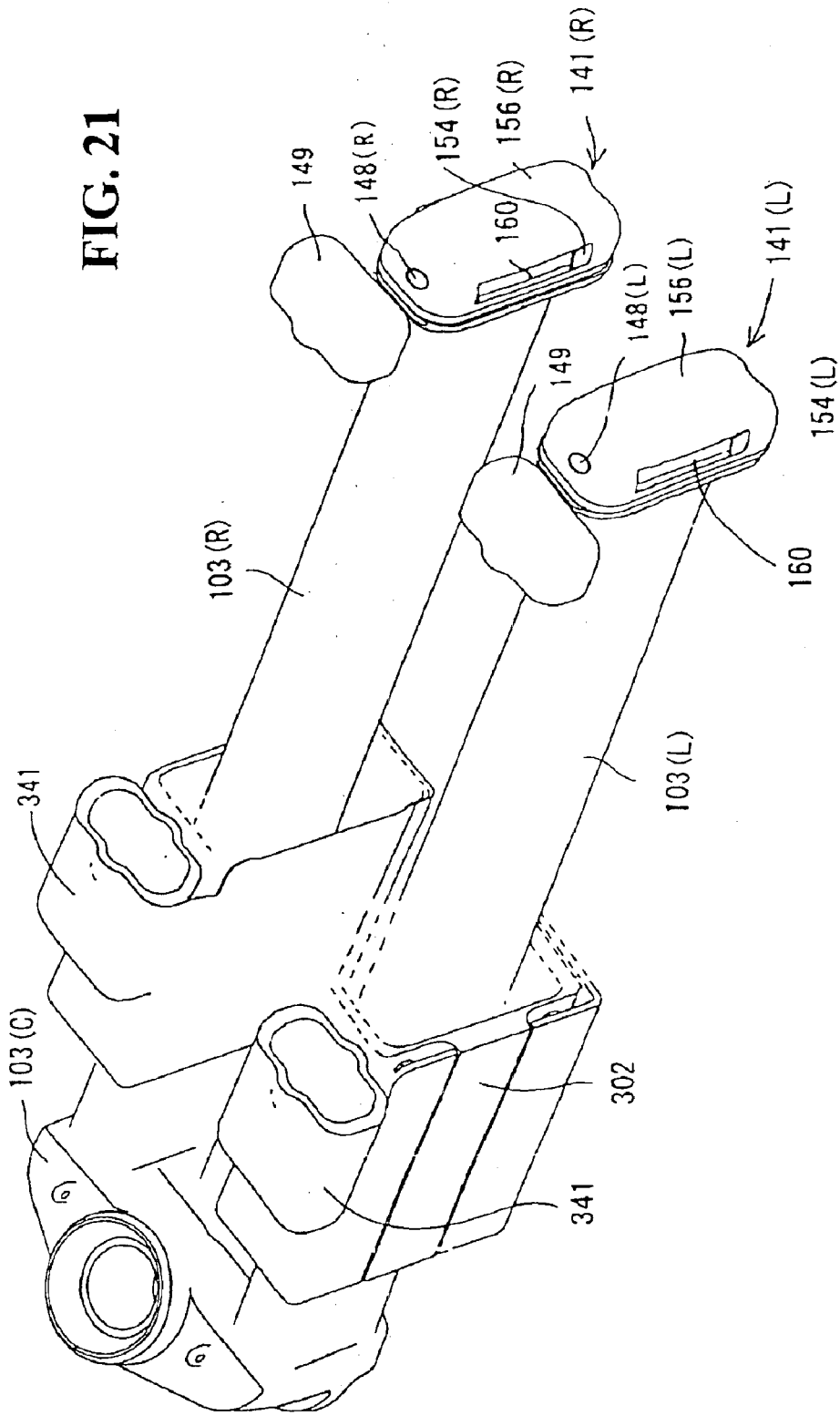
FIG. 21 is a view showing a positional relationship between a head pipe shaft portion and a guide roller in a contracted state of a frame.

FIG. 21 is a view showing a positional relationship between the head pipe shaft portions 103(R, L) and the guide rollers 302 in a frame contraction state, e.g., in an accommodation state. Each of the female connectors 161 is covered with a cover 341 together with the guide roller 302, and each of the male connectors 162 is covered with a cover 149. In the frame contraction state, since the guide rollers 302 are positioned forward of the head pipe shaft portions 103(R, L) and the male connectors 162 and the female connectors 161 are spaced away from each other, the front frame 1 and the center frame 3 are electrically isolated from each other. The operation elements 141 assume an upright posture.

Figure 22:
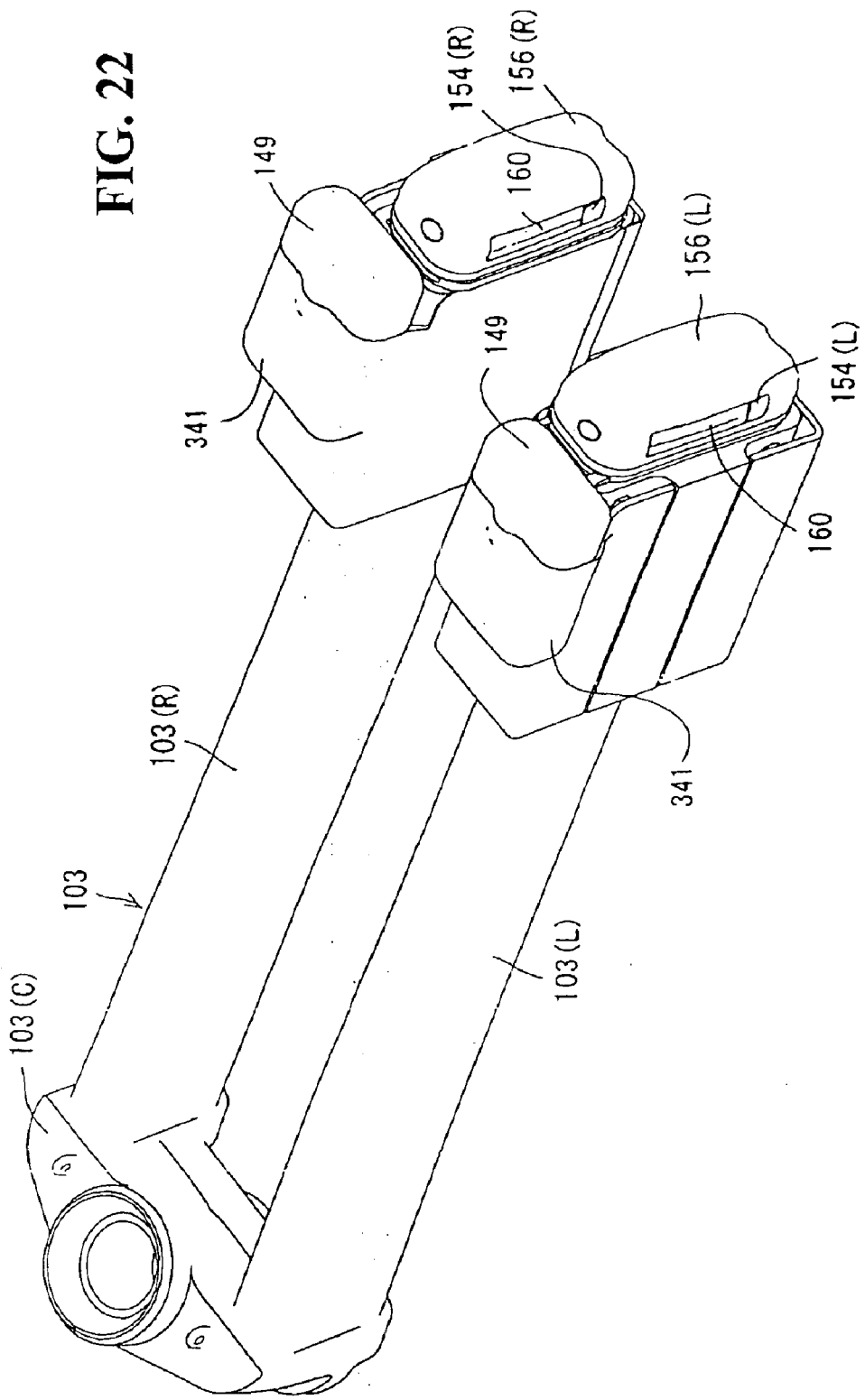
FIG. 22 is a view showing a positional relationship between the head pipe shaft portion and the guide roller in an extended state of the frame.

If the frame is extended from this contraction state to a maximum extension position, e.g., to an operating or traveling state of FIG. 22, then the guide rollers 302 are slidably moved to the extreme end portions of the head pipe shaft portions 103(R, L) and the male connectors 162 and the female connectors 161 are fitted with each other. The connectors 162 and 161 are consequently electrically connected to each other, and electric connection between the front frame 1 and the center frame 3 is established.

Since the electric connection between the components is cut in the accommodation state wherein the frame is contracted, even if a switch or the like is operated in error while the two-wheeled vehicle is in its accommodation state, no electric apparatus is rendered operative. Further, since the electric connection by the connectors 161 and 162 is established only at the maximum extension position of the vehicle body frame, traveling of the two-wheeled vehicle when the vehicle body frame is in any other position than the maximum extension position, e.g., while the vehicle body frame remains in an incompletely extended state, can be prevented.

Figure 23:
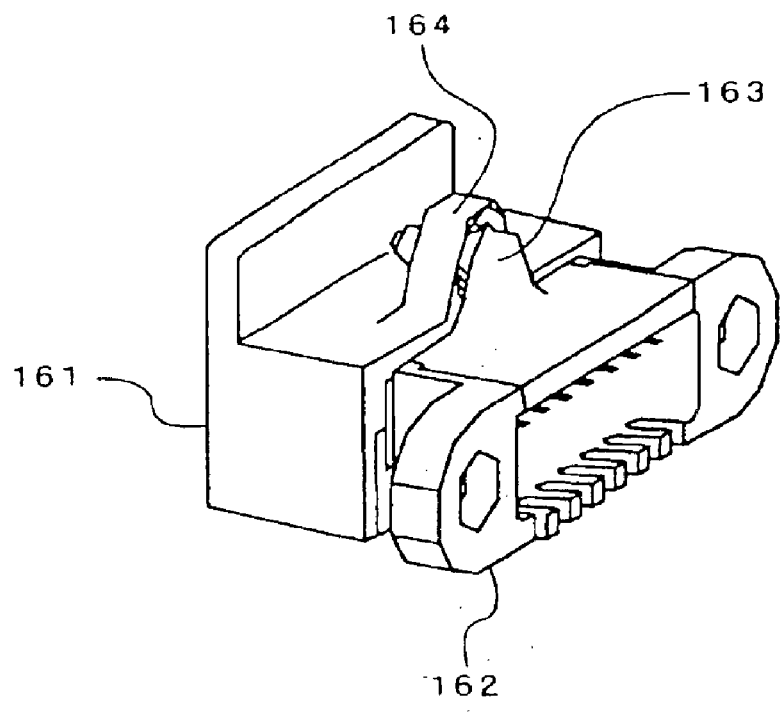
FIG. 23 is a perspective view showing connectors engaged with one another.
Figure 24:
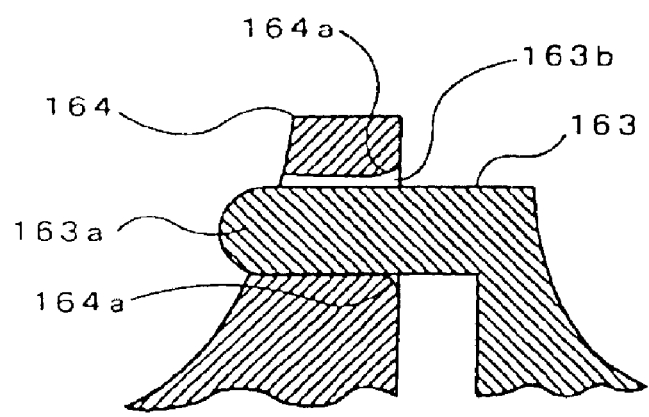
FIG. 24 is a view showing a configuration of guide members of the connectors.

FIG. 23 is a perspective view showing the connectors 161 and 162 while engaged with each other. Guide members 164 and 163 for guiding the connectors 161 and 162 relatively to appropriate positions when they are fitted with each other are formed at upper portions of the connectors 161 and 162, respectively. As shown in FIG. 24, the guide member 164 has a through-hole 163b formed therein, and a tapered portion 164a for facilitating guidance of a pin member 163a of the mounting member 163 into the through-hole 163b is formed at an opening end of the through-hole 163b.

Figure 46A:
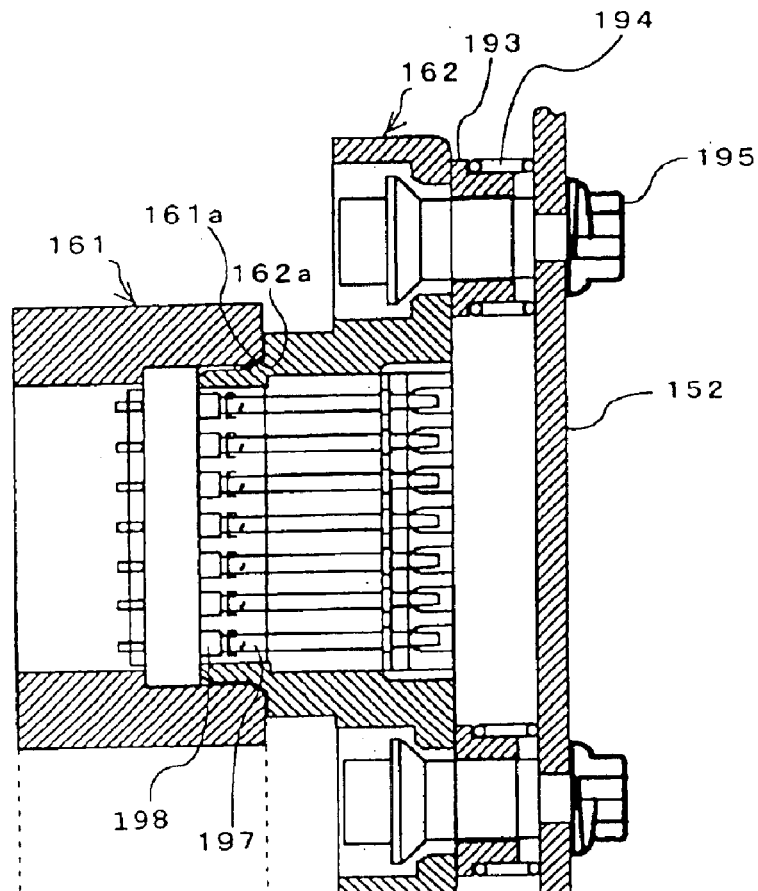
FIG. 46 is a sectional view of the connectors of the present invention in an engaged state.
Figure 46B:
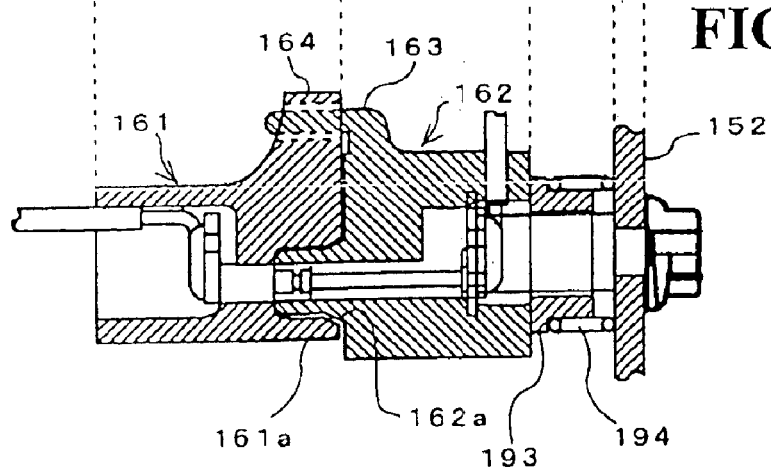

FIG. 46 is a sectional view of the connectors 161 and 162 in the fitting state. In FIG. 46, common reference characters to those appearing hereinabove denote similar or corresponding elements. The connector 162 is resiliently mounted on the base plate 152 (FIG. 20) by screws 195 through bosses 193 and springs 194. According to such a mounting method as just described, the connector 162 can normally be maintained in a resiliently floating state with respect to the base plate 152 by the bosses 193 resiliently acted upon by the springs 194. Accordingly, when the guide rollers 302 are slidably moved to the terminal end portions of the head pipe shaft portions 103(R, L) as shown in FIG. 22, even if the relative position between the connectors 161 and 162 suffers from some error, the error is compensated for with this arrangement. Consequently, a good fitting state between the connectors 161 and 162 can be achieved.

Figure 47A:
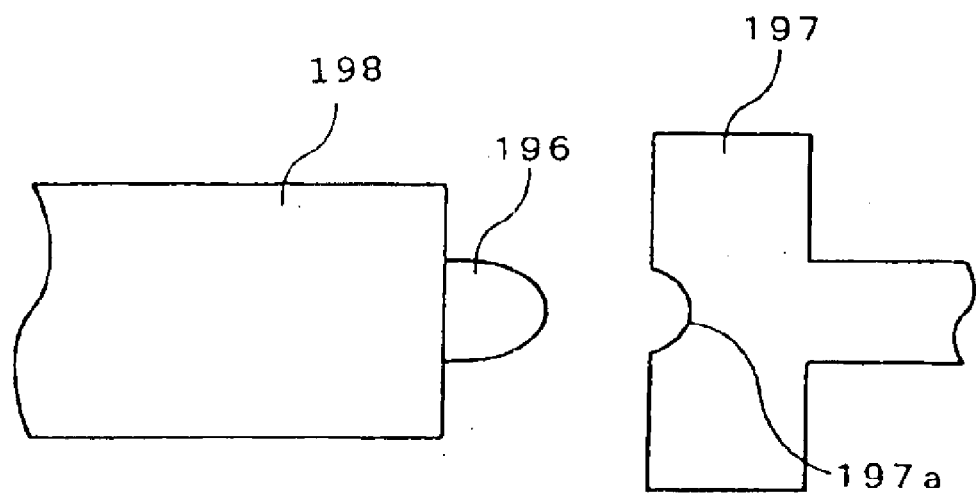
FIG. 47 is an enlarged view of contact portions of the connectors of the present invention.
Figure 47B:
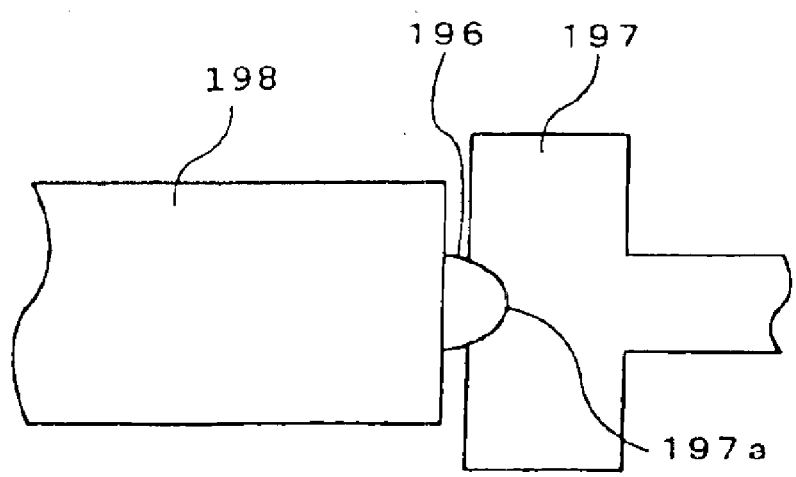

Since tapered portions 161a and 162a for facilitating fitting between the connectors 161 and 162 are formed at fitting portions of the connectors 161 and 162 in addition to the guide members 164 and 163, even if the relative position of the connectors 161 and 162 suffers from some error, since they are guided to their normal fitting positions relative to each other, a proper fitting state can be achieved. Furthermore, contacts 198 of the connector 162 are spring pins, and as shown in an enlarged scale in FIG. 47, a spring pin 196 projecting resiliently from a tip of each contact 198 is resiliently pressed against a recess 197a provided at an end of a contact 197 of the connector 161. Accordingly, since vibrations or positional displacement between the connectors 161 and 162 is absorbed, the electric connection at the frame connection portion can always be maintained in proper condition.

Figure 26A:
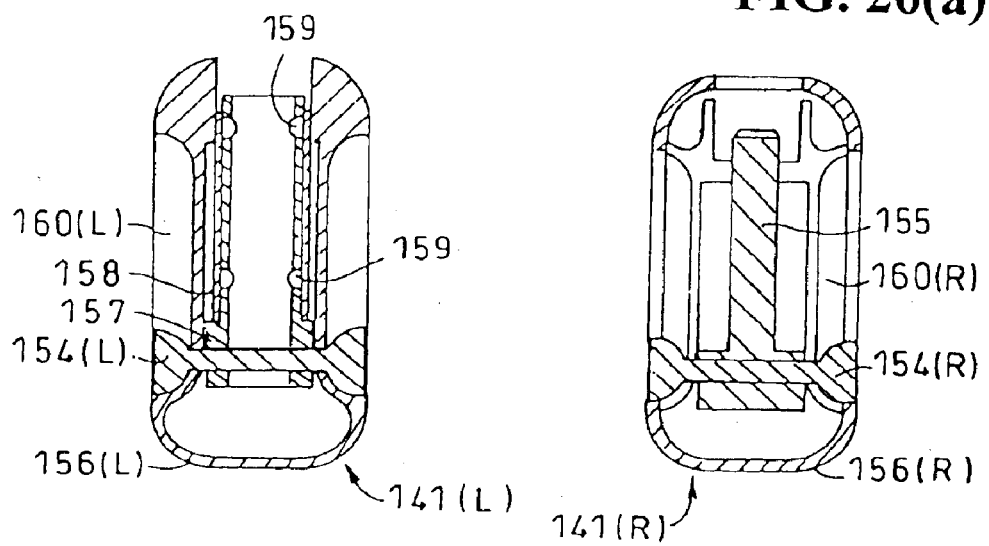
FIG. 26 is a sectional view of a manner of operation of an operation element.
Figure 26B:
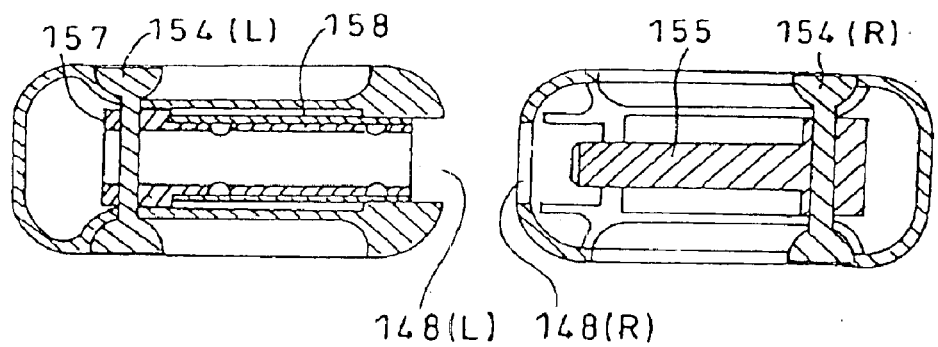
Figure 26C:
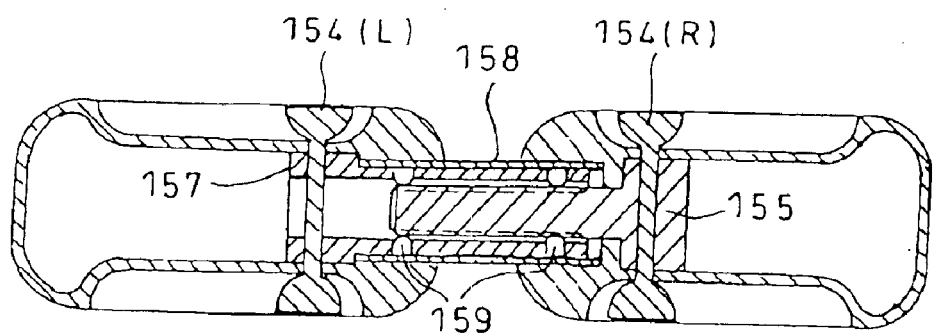

FIG. 26 is a sectional view of the operation elements 141(R, L). After the guide rollers 302 are slidably moved to the terminal ends of the head pipe shaft portions 103(R, L) as shown in FIG. 22, the operation elements 141 are grasped by the right and left hands and the operation element 141(R) on the right side is turned in the counterclockwise direction and the operation element 141(L) on the left side is turned in the clockwise direction both by 90° from the uprightly standing posture of FIG. 26(a) to the horizontally lying posture of FIG. 26(b). The levers 154 of the operation elements 141 are then grasped and slidably moved to the inner side as shown in FIG. 26(c).

At this time, the arresting pin 155 projects from the opening 148(R) in the operation element 141(R) on the right side, and the engaging tube 160 projects from the opening 148L in the operation element 141(L) on the left side. The arresting pin 155 is inserted into the engaging tube 160 until arrested or stopped by the arresting balls 159. Consequently, the right and left head pipe shaft portions 103(R, L) are mechanically connected to each other as shown in FIG. 27, and the frame rigidity of the vehicle during traveling is augmented.

Figure 25:
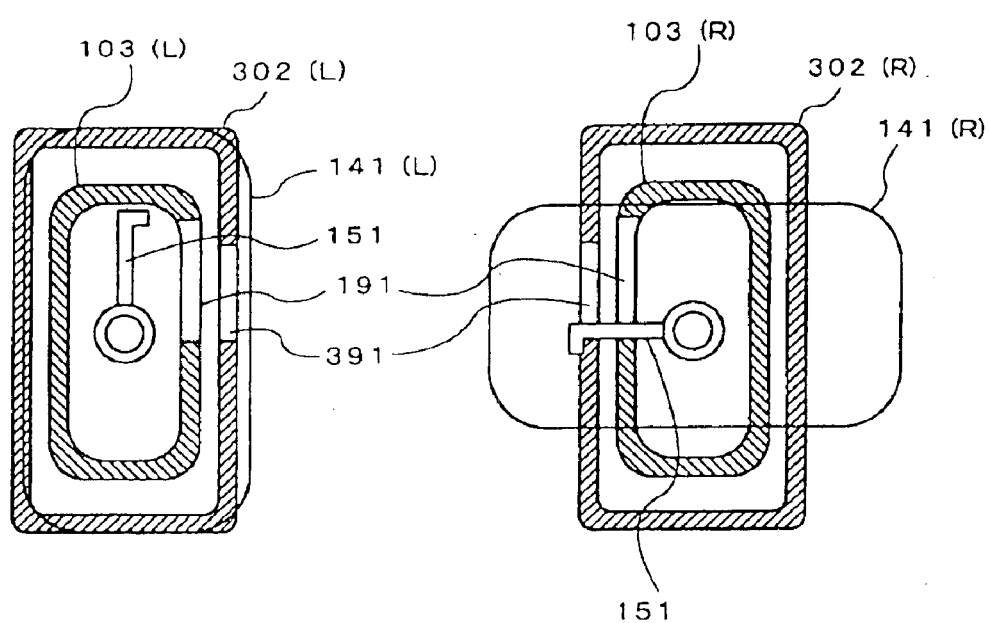
FIG. 25 is a view showing a locking function of the head pipe shaft portion of the present invention.

Further, in the traveling state wherein the operation elements 141 lie horizontally, the hook pipes 151 (refer to FIG. 19) in the head pipe shaft portions 103(R, L) are pivoted to the inner side by 90° as shown in FIG. 25 and engage with side portion openings 191 of the shaft portions 103(R, L) and side portion openings 391 of the guide rollers 302. Consequently, the guide rollers 302 and the shaft portions 103(R, L) are locked to each other thereby to inhibit relative sliding movement therebetween.

Figure 28:
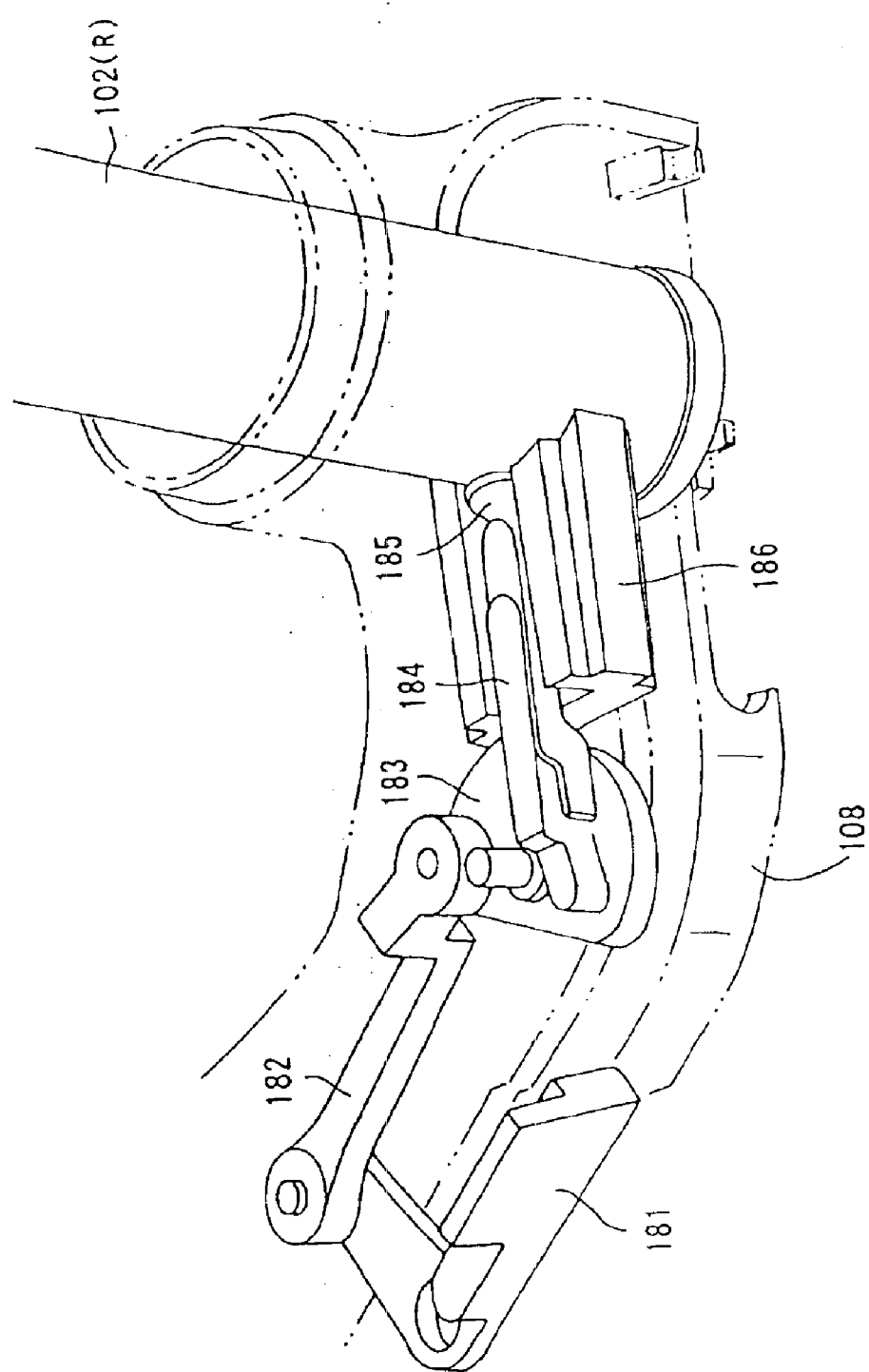
FIG. 28 is a partial, perspective view of a handle lock mechanism of the present invention.
Figure 29:
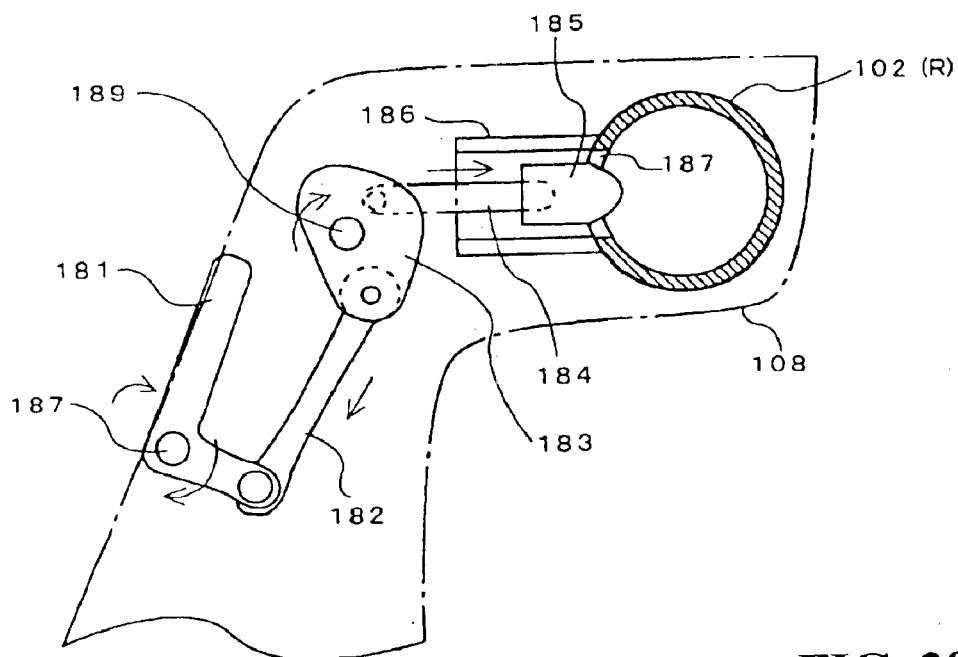
FIG. 29 is a view of the handle lock mechanism in a locked position as viewed from the rear side of a handle bridge.
Figure 30:
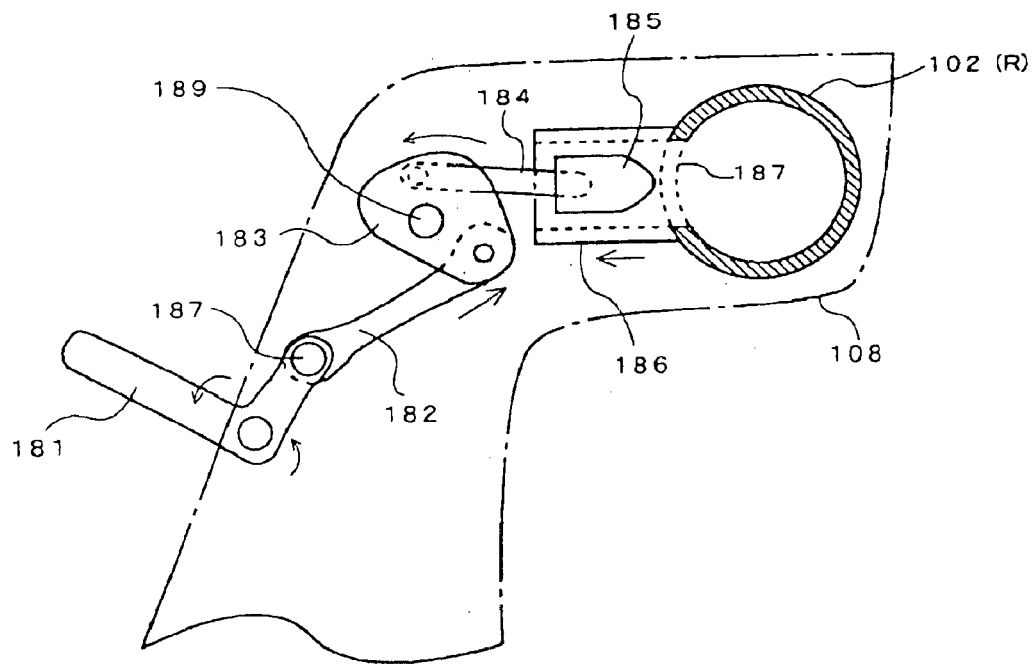
FIG. 30 is a view of the handle lock mechanism in an unlocking position as viewed from the rear side of the handle bridge.

If the left and right operation elements 141 are turned, then the front frame 1 can be locked to the center frame 3. Since the operation elements are disposed in proximity of each other, a locking/unlocking operation can be readily performed. Now, a lock mechanism for each of the handle shafts 102 is described. FIG. 28 is a partial perspective view showing a lock mechanism between the handle shaft 102 and the handle bridge 108. FIGS. 29 and 30 are views showing the handle lock mechanism as viewed from the rear side of the handle bridge 108. While the handle lock mechanism is provided for both of the left and the right of the handle shafts 102, an exemplary description is provided for the handle shaft 102(R) on the right side.

Figure 31:
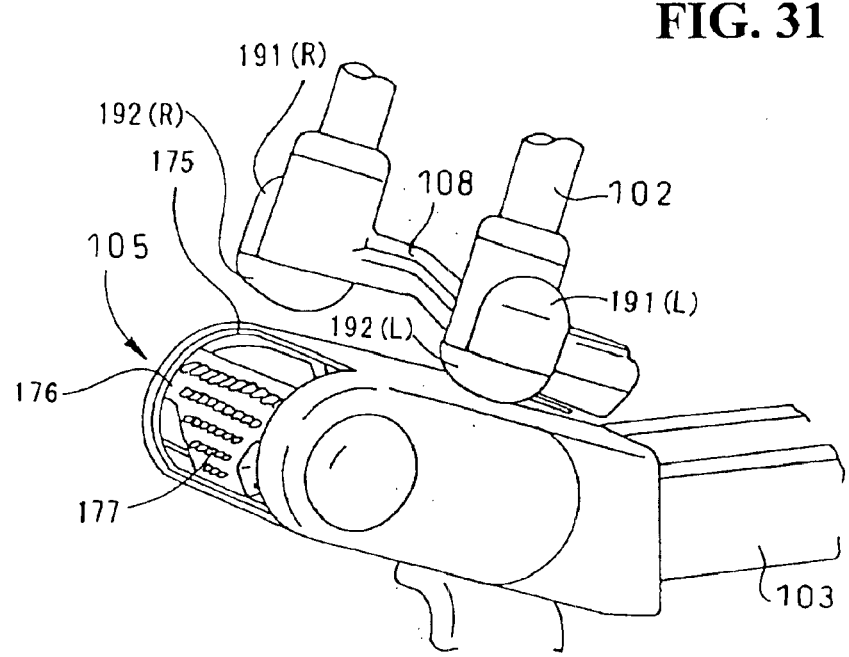
FIG. 31 is a view showing a handle shaft in an extended, operational state.

The handle lock mechanism includes an L-shaped operation lever 181, a rod 182, an eccentric crank 183, another rod 184, a pusher 185 and a pusher guide 186. In the extension state shown in FIG. 31, since the L-shaped operation lever 181 is pushed into the rear side of the handle bridge 108 as shown in FIG. 29, a tip of the pusher 185 enters an opening 187 provided at a side portion of the handle shaft 102 to stop the handle shaft 102 against sliding movement.

Figure 32:
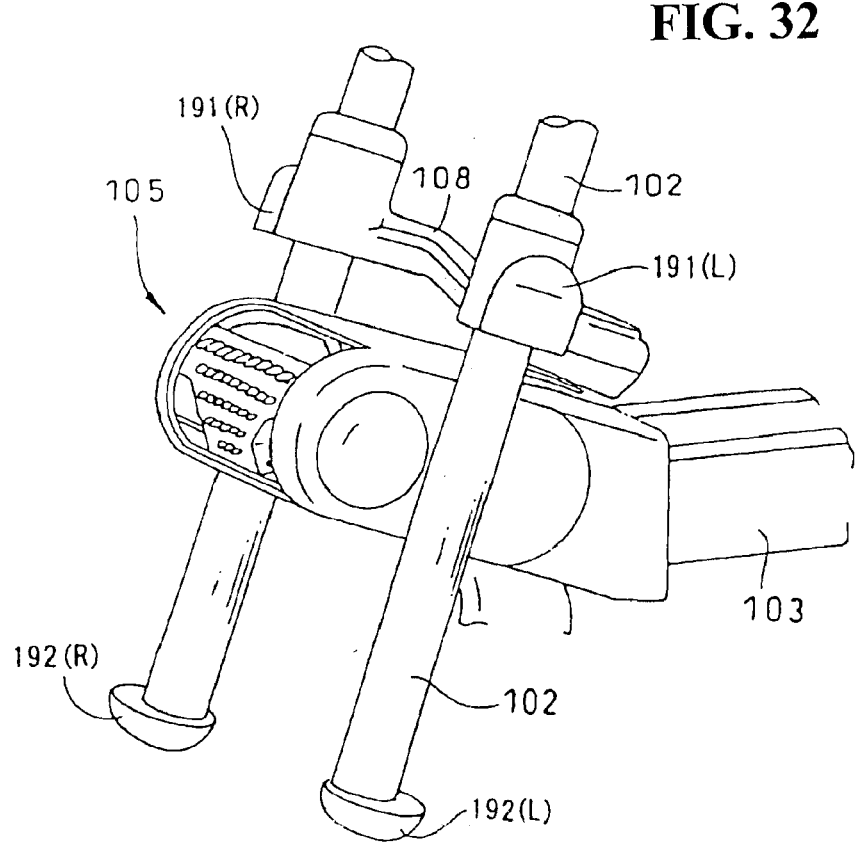
FIG. 32 is a view showing the handle shaft in an accommodation state.

If the L-shaped operation lever 181 is pulled out, then the eccentric crank 183 is pivoted in the counterclockwise direction and the pusher 185 is pulled out through the rod 184 as shown in FIG. 30. Accordingly, if the left and right L-shaped operation levers 181 are operated to release the handle lock and the handle shafts 102 are pushed down in this state, then the handle shafts 102 slide downward with respect to the handle bridge 108 as shown in FIG. 32. The connectors 191(R, L) and 192(R, L) are similar to the connectors 161 and 162 for electrically connecting the front frame 1 and the center frame 3 and are provided at side portions of the handle bridge 108 and the lower ends of the handle shafts 102(R, L). If the connectors 191(R, L) and 192(R, L) are spaced away from each other as a result of the sliding movement described above, then the handle bridge 108 and the handle shafts 102 are electrically disconnected from each other.

Figure 33:
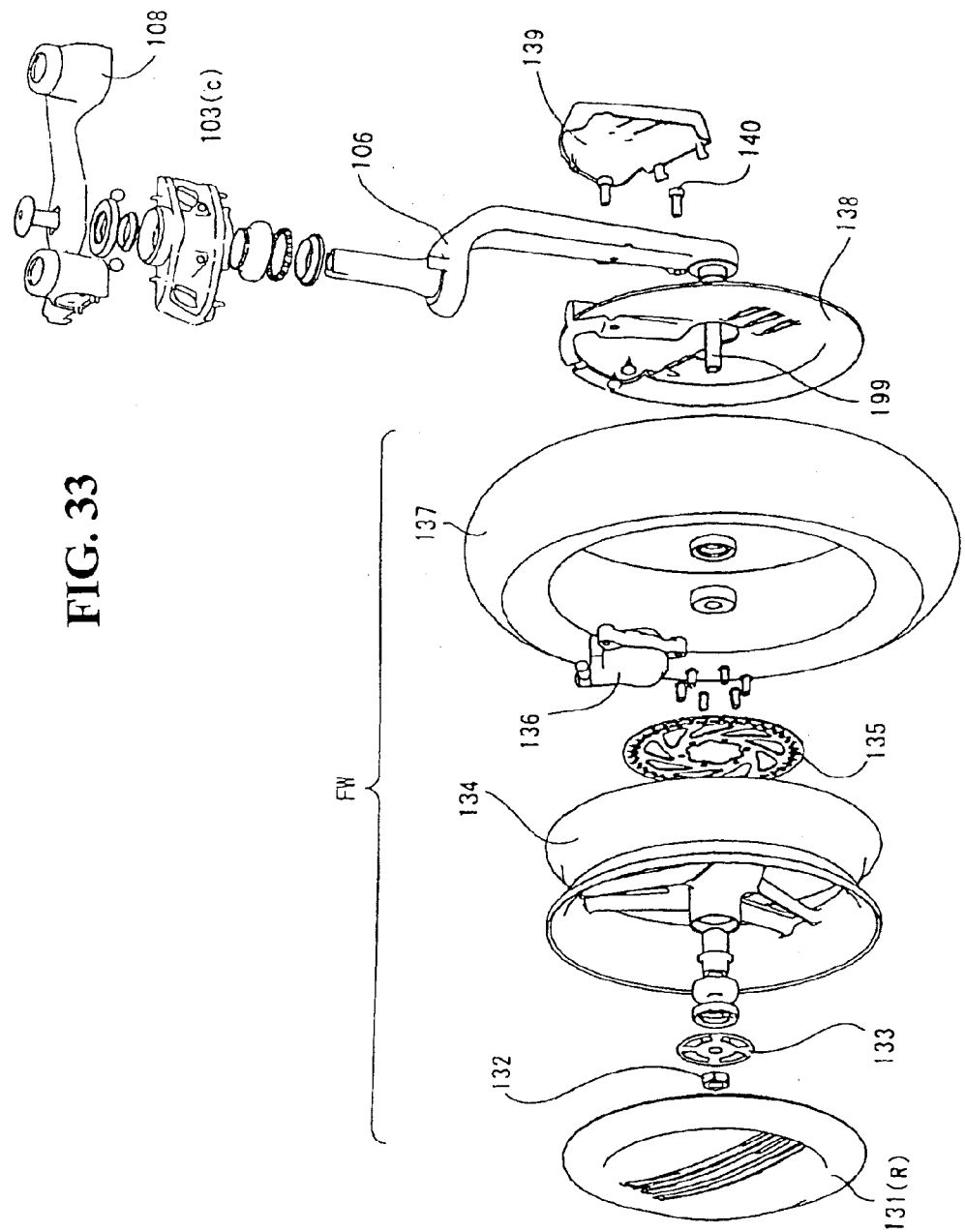
FIG. 33 is a view showing the construction of a front wheel of the present invention.

FIG. 33 is an exploded view showing a configuration of the front wheel FW. In FIG. 33, common reference characters to those appearing hereinabove denote similar or corresponding elements. The front wheel FW includes a mounting flange 133, a front wheel 134, a disk rotor 135 and a tire 137 as principal components thereof, and the disk rotor 135 is securely screwed to the front wheel 134. The front wheel FW is fitted on and supported in a cantilever-like manner on a front wheel axle 199 extending from an end of the front fork 106 together with left and right wheel caps 131 and 138 and is fastened by a nut 132. A brake caliper 136 is securely screwed to the front fork 106 together with a wheel cap 138. A caliper cover 139 is secured to the wheel cap 138.

Figure 34:
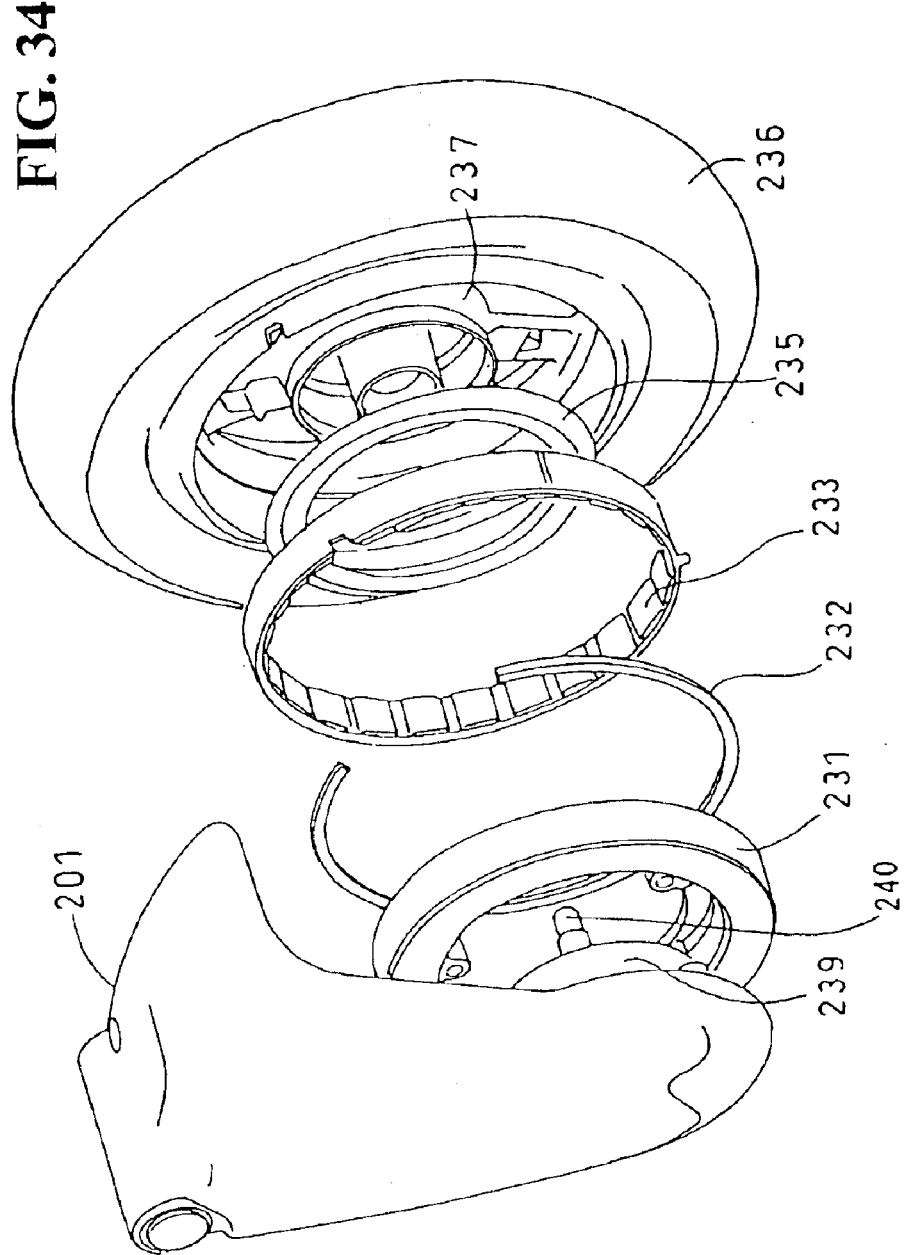
FIG. 34 is a view showing the construction of a rear wheel of the present invention.
Figure 35:
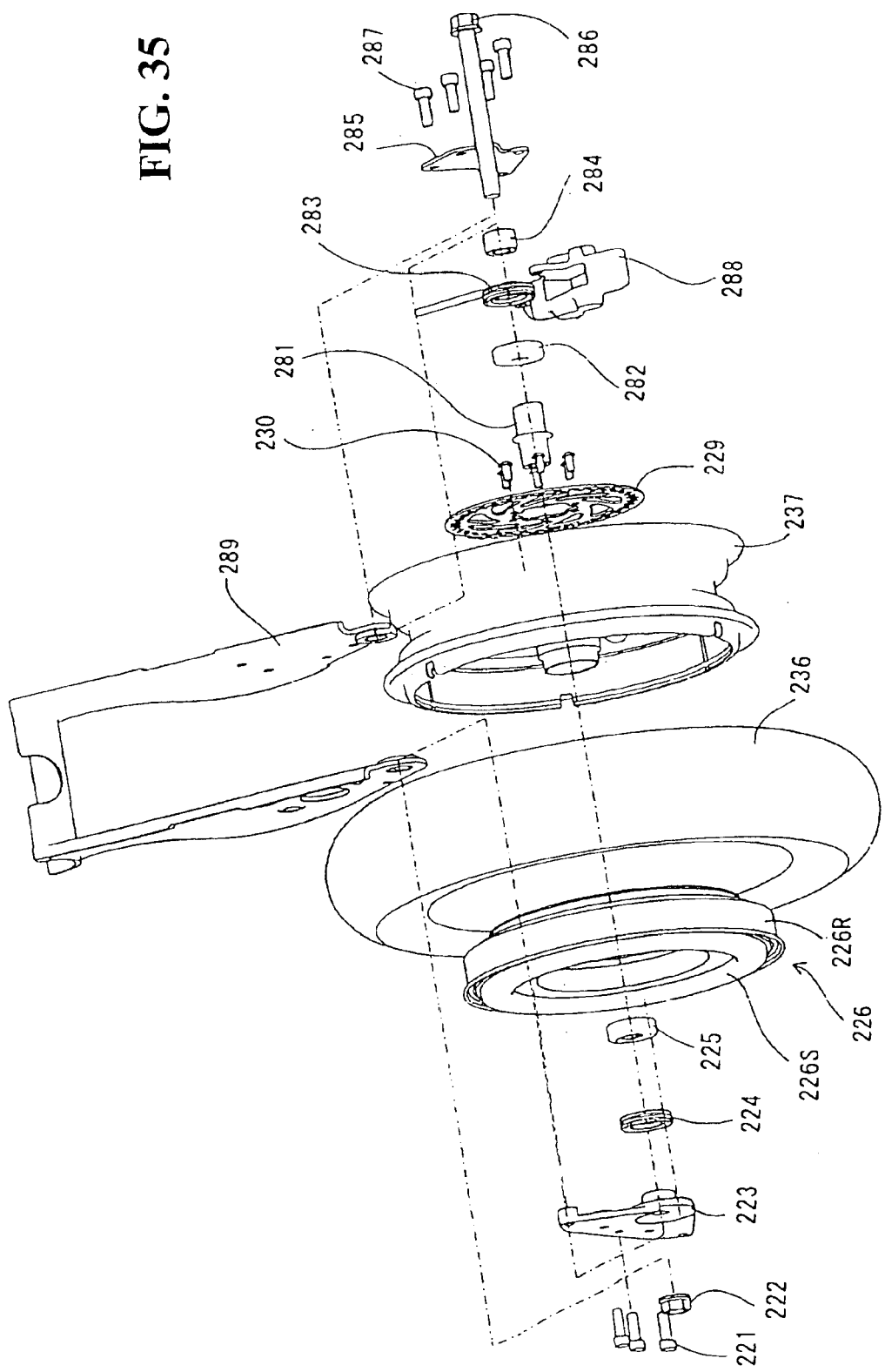
FIG. 35 is a view showing another configuration of the rear wheel.

FIG. 34 is an exploded view showing a configuration of the rear wheel RW. In FIG. 34, common reference characters to those appearing hereinabove denote similar or corresponding elements. The swing arm 201 includes a drum brake 239 and a rear wheel axle 240. A stator 231 is securely screwed to an outer periphery of the drum brake 239. On the rear wheel 237 side, a sensor 235 and a magnet rotor 233 are fitted coaxially and secured by a clip 232. FIG. 35 is an exploded view showing another configuration of the rear wheel RW. In FIG. 35, common reference characters to those appearing hereinabove denote similar or corresponding elements.

The rear wheel RW includes a rear wheel tire 236 and the rear wheel 237 for the rear wheel tire 236, a drive motor 226 accommodated on the inner side of the rear wheel 237, and a disk rotor 229 and a caliper 288 for the disk rotor 229 as principal components. The drive motor 226 includes a stator 226S and a magnet rotor 226R that rotates on the outer side of the stator. The rear wheel 237 is supported on a rear wheel shaft 286 through a center shaft 281 and left and right bearings 252 and 282. Left and right dust seals 224 and 283, a collar 284 and a bracket 223 are fitted on the rear wheel shaft 286 and are securely fastened to a rear fork 289 by a nut 222.

Figure 36:
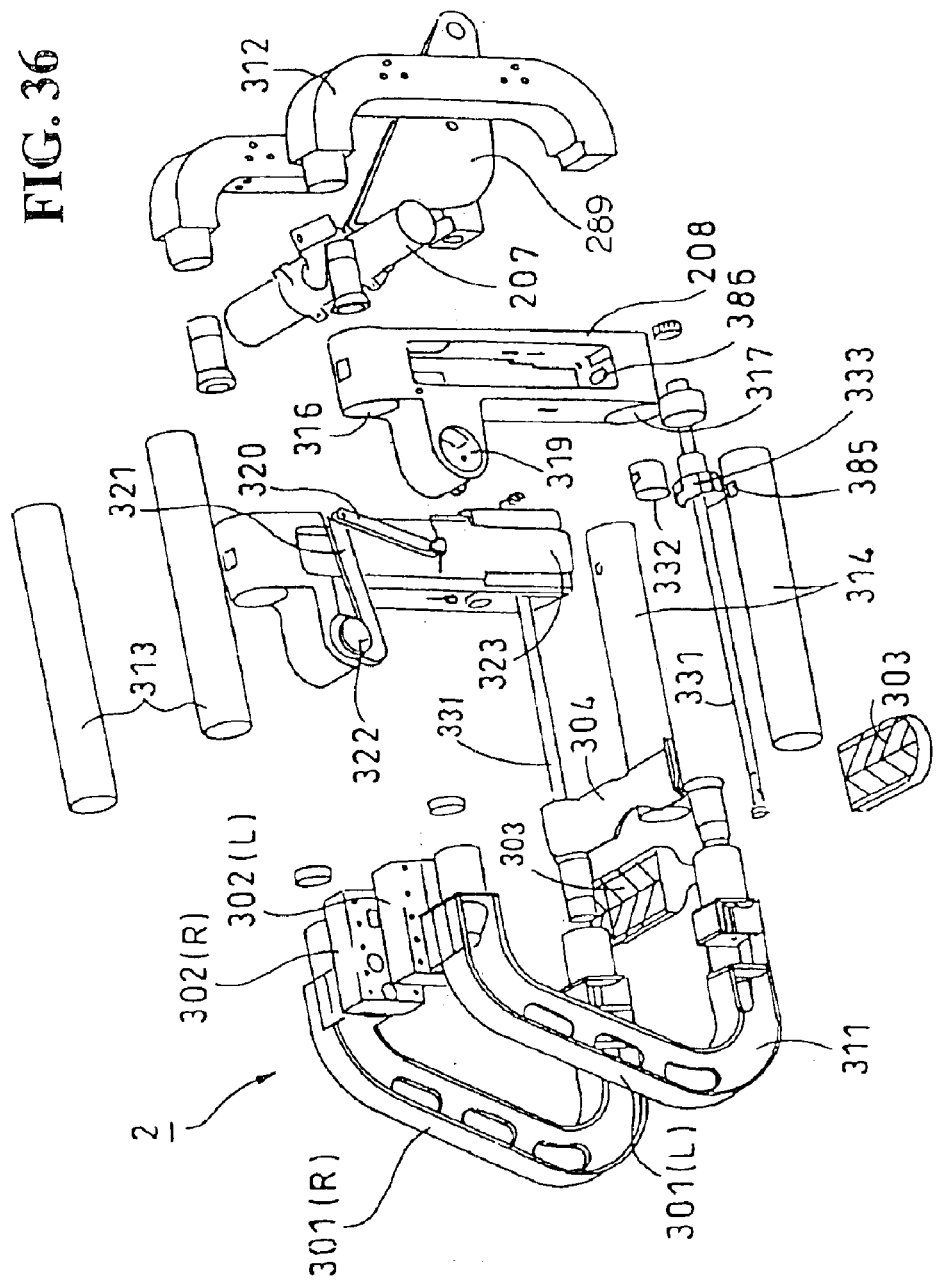
FIG. 36 is a view showing a structure for supporting the rear wheel shown in FIG. 35.

The stator 226S of the drive motor 226 is secured to the rear fork 289 through the bracket 223. The disk rotor 229 is securely fastened to the right side of the rear wheel 237 by screws 230. The caliper 288 is securely fastened to the rear frame 2 through a caliper stay 285 by screws 287. The rear fork 289 is connected and secured at one end thereof to the swing shaft 207 as shown in FIG. 36. Accordingly, the rear fork 289 is secured to the vehicle body frame without being rocked relative to the frame.

Figure 37:
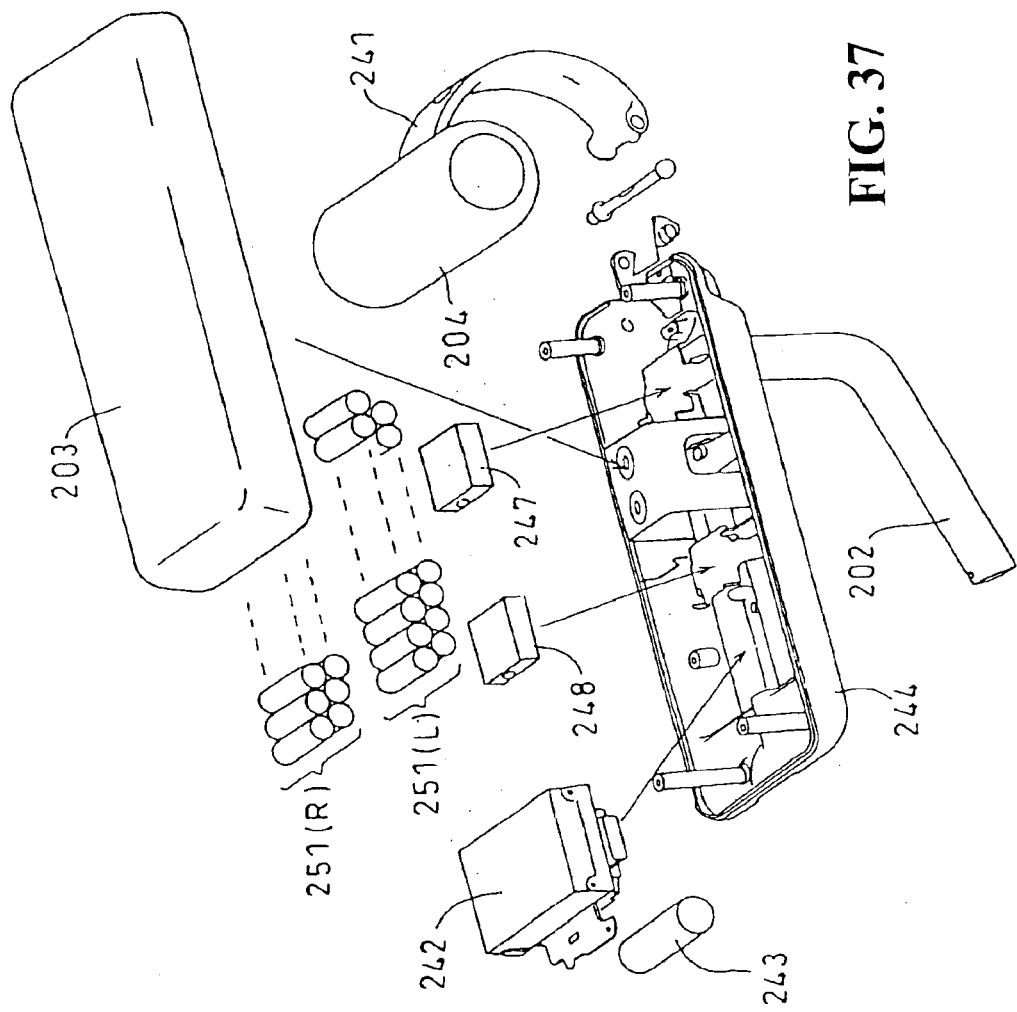
FIG. 37 is a view showing a configuration of a power supply accommodation section of the present invention.
Figure 38:
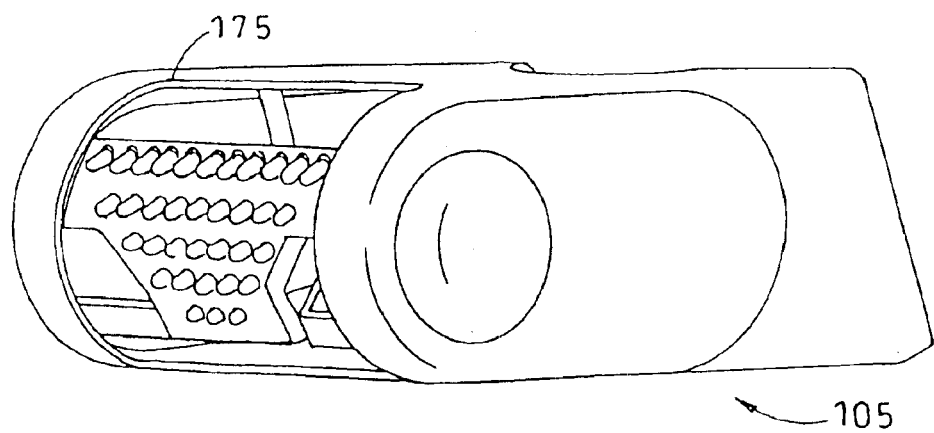
FIG. 38 is a perspective view of a headlamp unit.
Figure 39:
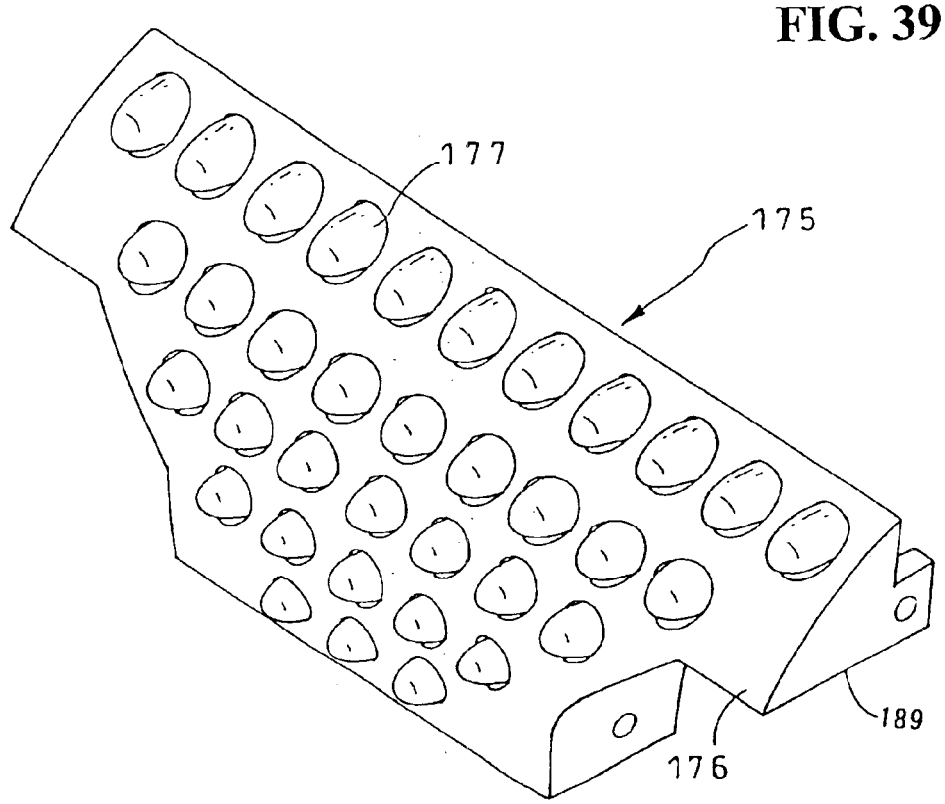
FIG. 39 is a perspective view of a headlamp light source section.
Figure 40:
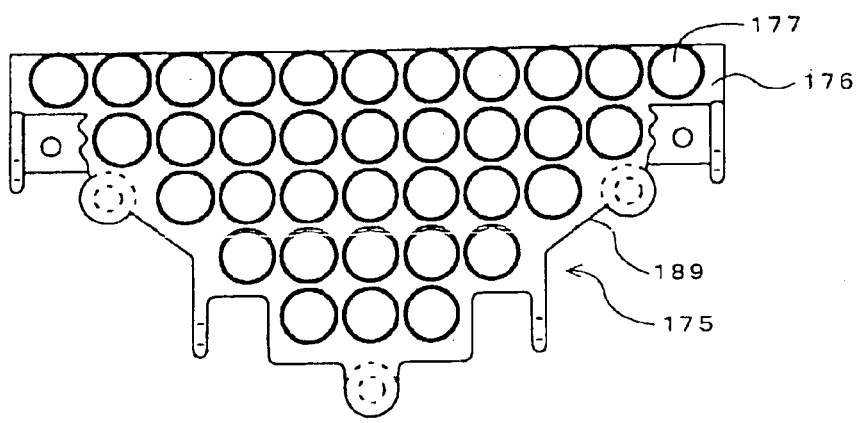
FIG. 40 is a front, elevation view of the headlamp light source section.

FIG. 37 is a view showing a configuration of a power supply accommodation section 244 provided below the seat 203. Two battery units 251(R, L), each including a plurality of unit cells juxtaposed like barrels and shrink-packed into a unitary block, are accommodated in the power supply accommodation section 244 together with breaker switchs 247 and 248 and a control unit 242 having a DC-DC converter and a high capacitance capacitor 243. FIG. 38 is a perspective view of the headlamp unit 105. FIG. 39 is a perspective view of a light source section 175 built in the headlamp unit 105. FIG. 40 is a front elevation view of the light source section 175, and FIG. 41 is a side elevation view of the light source section 175.

Figure 41:
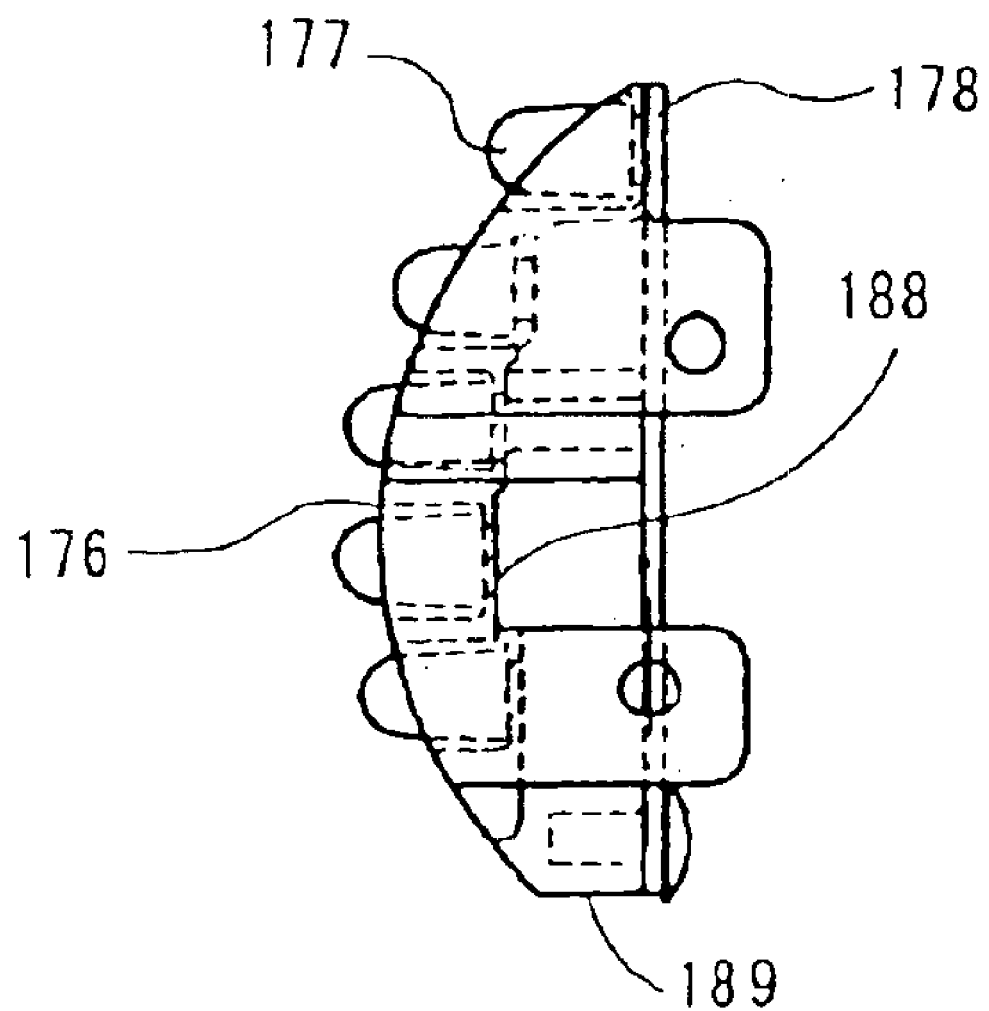
FIG. 41 is a side, elevation view of the headlamp light source section.

The light source section 175 in the present embodiment includes, as shown in FIGS. 40 and 41, a base member 189, a base plate 178 mounted on the base member 189, and a plurality of LEDs 177 held three-dimensionally by the base member 189. The base member 189 has a curved base face 176 in which a large number of openings are provided in rows and columns. A stepped abutting face 188 is formed on the bottom of each of the openings. Each of the white LEDs 177 of high luminance is accommodated in one of the openings such that it is partly exposed forwardly by a predetermined distance from the base face 176. Each of the LEDs 177 is soldered at electrode pins thereof to the base plate 178 in a pushed-in state such that the rear face thereof is abutted with the abutting face 188. Accordingly, the length of the exposed portion of each of the LEDs 177 is defined by the step of the abutting face 188. A drive circuit for driving the LEDs 177 is carried on the base plate 178.

Figure 42:
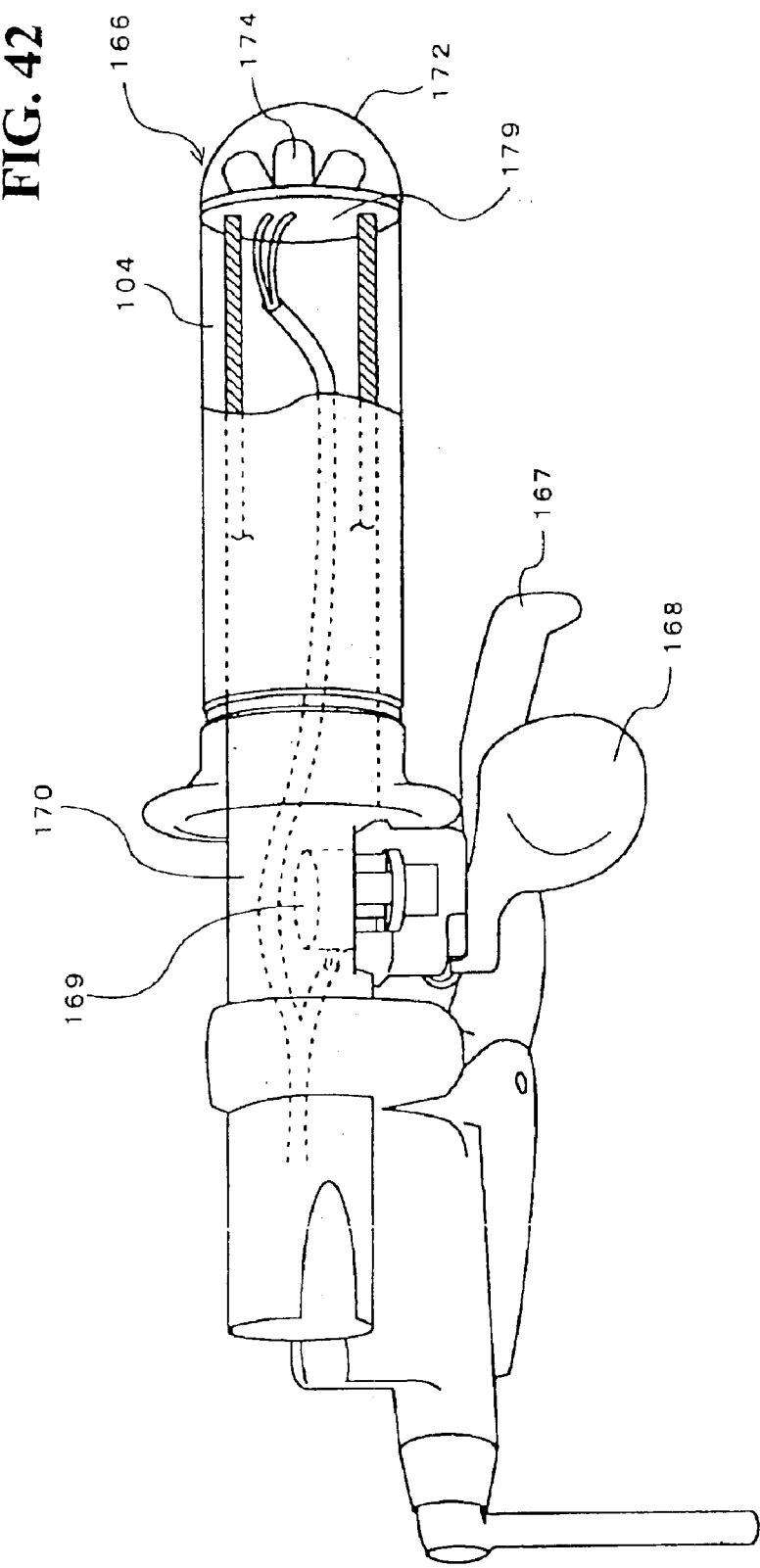
FIG. 42 is a partial view of a handle grip and associated elements according to the present invention.

In this manner, LEDs can be disposed three dimensionally without using a curved base plate. Further, since the heights or the directions of the LEDs do not rely upon soldering between the base plate 178 and the LED electrodes, the LEDs can be disposed three-dimensionally with a high degree of light distribution accuracy and without individual differences. FIG. 42 is a view showing a configuration of the right side handle grip and associated elements. A blinker unit 166, described in greater detail hereinafter is mounted on a handle pipe 170, and the grip 104 is mounted on an outer periphery of the blinker unit 166. A brake lever 167 and an accelerator lever 168 are provided at an inner side end portion of the grip 104, e.g., within a range within which, when the grip is gripped with the right hand, the thumb of the right hand reaches. The opening of the accelerator lever 168 is detected by an accelerator opening sensor 169.

Figure 43:
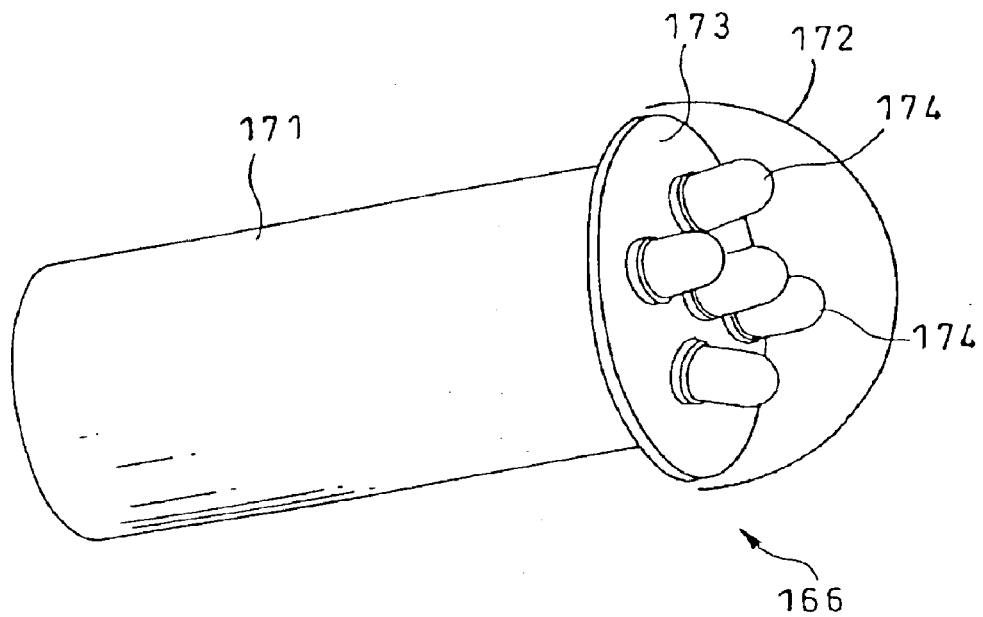
FIG. 43 is a perspective view of a blinker unit.
Figure 44A:
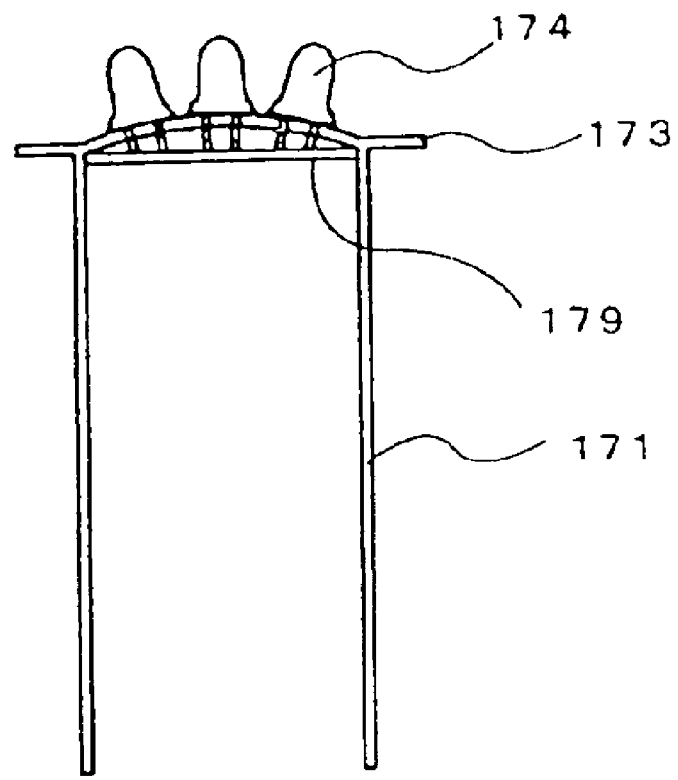
FIG. 44 is a sectional view of the blinker unit.
Figure 44B:
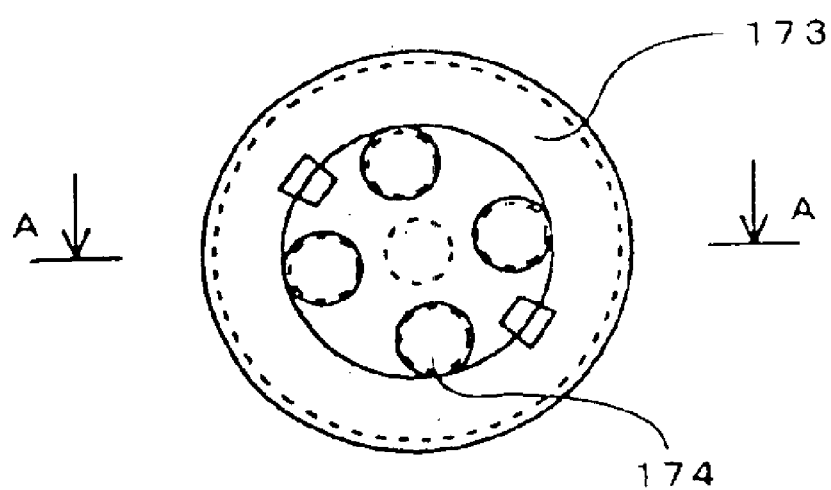

FIG. 43 is a perspective view of the blinker unit 166. FIG. 44(a) is a sectional view and FIG. 44(b) is an end portion front elevation view of the blinker unit 166. The blinker unit 166 in the present embodiment includes, as shown in FIG. 44, a support pipe 171 fitted in the handle pipe 170, a base plate 179, a circular supporting portion 173 provided at an end of the support pipe 171 and expanded spherically at a central portion thereof, and five LEDs 174 of high luminance. The end portion of the support pipe 171 at which the LEDs 174 are exposed are covered with a transparent cap 172 as shown in FIG. 43.

The five LEDs 174 are disposed such that four LEDs are secured to the base plate 179 in a spaced relationship by 90° from each other around the center at which the remaining one LED is positioned such that optical axis thereof are displaced a slightly outward from the center axis. Adjustment of the optical axis of each of the LEDs 174 is performed such that the LED 174 is inserted until the bottom thereof is abutted with the spherical face of the circular supporting portion 173 and electrodes thereof are fixed to the base plate 179.

Figure 45:
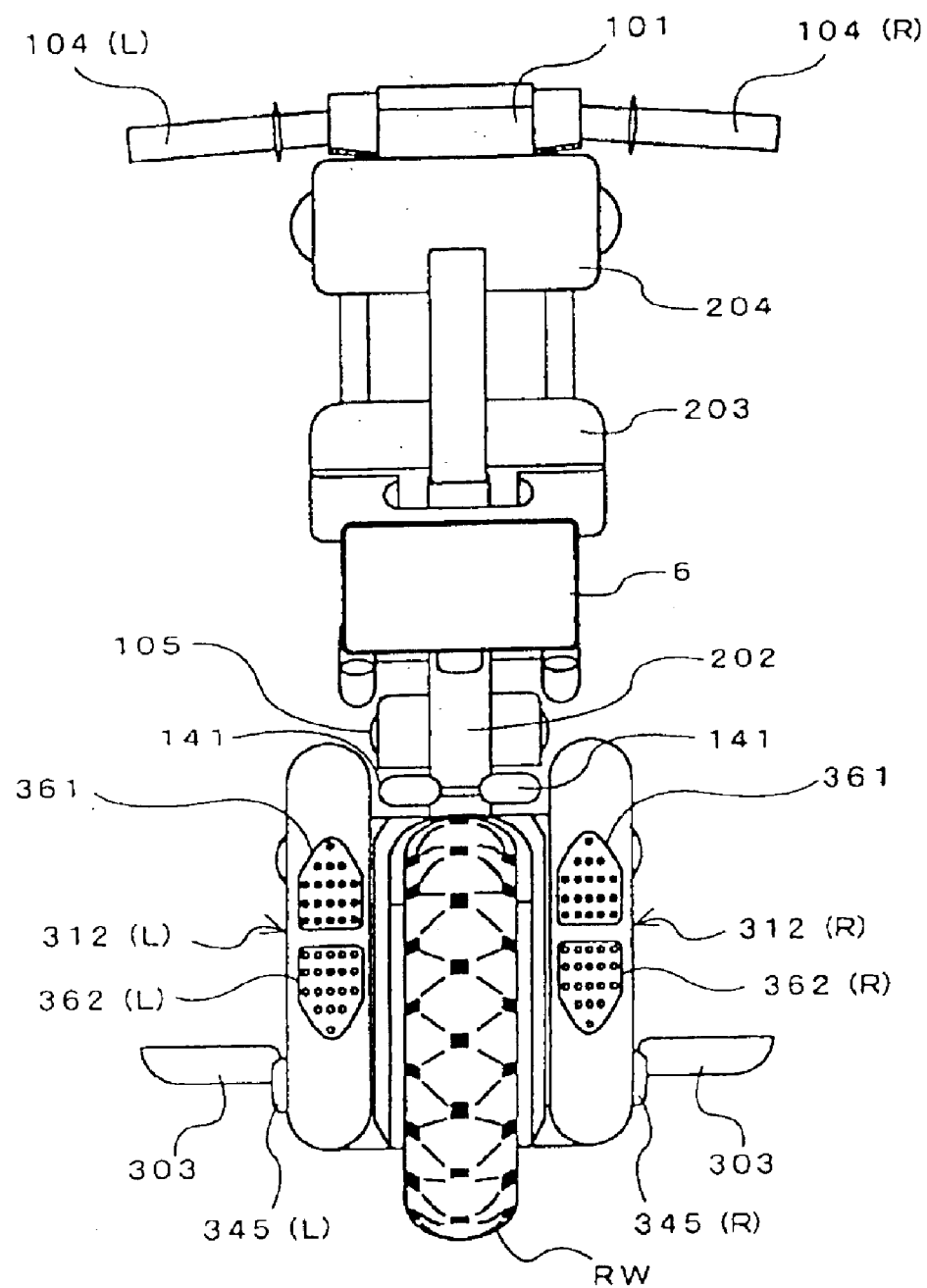
FIG. 45 is a rear, elevation view of the motor-driven, two-wheeled vehicle.

With such a configuration as just described, the light distribution characteristic of the blinker can be defined accurately by the shape of the circular supporting portion 173. Further, since the blinker can be formed in a small size at an end portion of the handle, the blinker does not impede the operability of the handle. FIG. 45 is a rear elevation view of the motor-driven two-wheeled vehicle. In FIG. 45, common reference characters to those appearing hereinabove denote similar or corresponding elements. In the present embodiment, a large number of red LEDs are disposed three-dimensionally at rear portions of frame bodies 312(R, L) to form brake lamps 361(R, L), and orange LEDs are disposed three-dimensionally on the lower side of the brake lamps 361(R, L) to form blinker lamps 362(R, L). A license plate 6 is disposed rearwardly of the seat 203.

Since LEDs are adopted as light sources for the headlamp, brake lamps and blinkers, power saving essential to an electrically operated vehicle can be achieved. Further, where LEDs are adopted for a light source, restrictions in design are moderated, and consequently, the appearance can be augmented.

According to the present invention, one or more of the following beneficial effects are achieved. Since a two-wheeled vehicle is formed from three frames and the front frame and the rear frame are mounted for sliding movement in forward and backward directions with respect to the center frame, the overall length of the two-wheeled vehicle in an accommodation state can be reduced without adopting a complicated folding mechanism. Since further contraction of the two-wheeled vehicle in the forward and backward direction when it is accommodated can be achieved, the two-wheeled vehicle can be accommodated in a trunk space of a four-wheeled vehicle such that the forward and backward direction thereof may coincide with the forward and backward direction of the four-wheeled vehicle. Accordingly, by pivoting a seat post of the two-wheeled vehicle, a seat and a backrest of the smaller vehicle can function as part of a rear seat of the vehicle, and reduction in space and weight can be achieved by common usage of these functioning parts.

Since the two-wheeled vehicle and the four-wheeled vehicle are fastened to each other by a fastening element in an interlocking relationship with an operation for displacing part of the two-wheeled vehicle in order to cause the part of the two-wheeled vehicle as part of the four-wheeled vehicle, the necessity for a fastening operation is eliminated. In addition, the two-wheeled vehicle can be prevented from being separated or unfastened from the four-wheeled vehicle. Since an electrical contact is provided on the fastening element and a battery of the two-wheeled vehicle is charged by a power supply of the four-wheeled vehicle through the fastening element, traveling time of the larger vehicle can be used for the charging of the smaller vehicle without establishing a connection to a separate charging apparatus.

Since a seat and a seat back of the two-wheeled vehicle integrally function as a backrest and a headrest of the larger vehicle, and the design including the backrest and the headrest of the rearmost seat of the vehicle, is the same design of those of the remaining seats of the vehicle, consistency can be provided with designs. Since a rear hatch of the vehicle is formed from an upwardly opening, upper hatch and a lower hatch that can be opened downward, the opening can be formed with a large area and with a low, accessible entry point for the smaller vehicle. Since the road clearance of the lower hatch in its open state is equal to the axle height of the two-wheeled vehicle, accommodation of the two-wheeled vehicle is facilitated and made easier with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A two-wheeled vehicle for being loaded onto an accommodating vehicle, said two-wheeled vehicle comprising a seat, wherein the seat of said two-wheeled vehicle serves as a backrest of a seat of said accommodating vehicle and wherein a portion of the two-wheeled vehicle serves as an operable part of the accommodating vehicle.

2. The two-wheeled vehicle according to claim 1, further comprising a seat back, wherein the seat back of said two-wheeled vehicle serves as a headrest of the seat of said accommodating vehicle.

3. A two-wheeled vehicle for being loaded onto an accommodating vehicle, said two-wheeled vehicle comprising a seat back, wherein the seat back of said two-wheeled vehicle serves as a headrest of a seat of said accommodating vehicle, wherein a portion of the two-wheeled vehicle serves as an operable part of the accommodation vehicle.

4. A two-wheeled vehicle for being loaded onto an accommodating vehicle, said two-wheeled vehicle comprising:
   a seat; and
   a seat post supporting said seat, said seat post being pivotable about a predetermined axis of pivotal motion, wherein said seat of said two-wheeled vehicle serves as a backrest of a seat of said accommodating vehicle when arranged in an accommodating position with respect to said predetermined axis of pivotal motion, wherein a portion of the two-wheeled vehicle serves as an operable part of the accommodation vehicle.

5. The two-wheeled vehicle according to claim 4, said two-wheeled vehicle including a fastening element projecting downwardly in an interlocking relationship when said seat post is in the accommodating position, said two-wheeled vehicle and said accommodating vehicle capable of being fastened to each other by said fastening element.

6. The two-wheeled vehicle according to claim 4, wherein said two-wheeled vehicle is a motor-driven, two-wheeled vehicle and said fastening element includes an electrical contact connected to a power supply line, said two-wheeled vehicle being charged from said accommodating vehicle through said electrical contact.

7. A two-wheeled vehicle for being loaded onto an accommodating vehicle, said two-wheeled vehicle comprising:
   a seat back; and
   a seat post supporting said seat back, wherein said seat back serves as a headrest of a seat of said accommodating vehicle in a state wherein the seat post is pulled forward around a predetermined axis of pivotal motion.

8. A two-wheeled vehicle loadable system for loading a two-wheeled vehicle into a trunk space of an accommodating vehicle, wherein a portion of the two-wheeled vehicle serves as an operable part of the accommodating vehicle said two-wheeled vehicle comprising a seat, wherein the seat of said two-wheeled vehicle serves as a backrest of a seat of said accommodating vehicle.

9. The system according to claim 8, said two-wheeled vehicle further comprising a seat back, wherein the seat back of said two-wheeled vehicle serves as a headrest of the seat of said accommodating vehicle.

10. A two-wheeled vehicle loadable system for loading a two-wheeled vehicle into a trunk space of an accommodating vehicle, wherein a portion of the two-wheeled vehicle serves as an operable part of the accommodating vehicle said two-wheeled vehicle comprising a seat back, wherein the seat back of said two-wheeled vehicle serves as a headrest of a seat of said accommodating vehicle.

11. Said two-wheeled vehicle comprising:
   a seat;
   a seat back; and
   a seat post supporting said seat, said seat post and said seat back being pivotable about a predetermined axis of pivotal motion, wherein said seat of said two-wheeled vehicle serves as a backrest of a seat of said accommodating vehicle when arranged in an accommodating position with respect to said predetermined axis of pivotal motion and said seat post serves as a headrest of the seat of said accommodating vehicle in the accommodating position.

12. The system according to claim 11, said two-wheeled vehicle including a fastening element projecting downwardly in an interlocking relationship if said seat post is in an accommodating position, said two-wheeled vehicle and said accommodating vehicle being fastened to each other by said fastening element.

13. The system according to claim 12, wherein said two-wheeled vehicle is a motor-driven, two-wheeled vehicle and said fastening element includes an electrical contact connected to a power supply line, said two-wheeled vehicle being charged from said accommodating vehicle through said electrical contact.

14. A two-wheeled vehicle loadable system for loading a two-wheeled vehicle into a trunk space of an accommodating vehicle, wherein a portion of the two-wheeled vehicle serves as an operable part of the accommodating vehicle said accommodating vehicle including a plurality of rows of seats in a forward and a rearward direction, and wherein a seat and a seat back of said two-wheeled vehicle serves as a backrest and a headrest of a rearmost seat of said accommodating vehicle, respectively.

15. The system according to claim 14, further comprising additional seats of said accommodating vehicle, wherein the backrest and the headrest of the rearmost seat of said vehicle has a backrest and a headrest design equal to that of the additional seats of the accommodating vehicle.

16. A two-wheeled vehicle loadable system for loading a two-wheeled vehicle into a trunk space of an accommodating vehicle, wherein a portion of the two-wheeled vehicle serves as an operable part of the accommodating vehicle said accommodating vehicle comprising:
   a rear hatch covering said trunk space, said rear hatch including
   an upper hatch opening in an upward direction, and
   a lower hatch opening in a downward direction, wherein a road clearance of said lower hatch in an opened state is equal to an axle height of said two-wheeled vehicle.

17. A method of loading a two-wheeled vehicle onto a accommodating vehicle, said method comprising:
   loading a two-wheeled vehicle onto the accommodating vehicle, wherein a portion of said two-wheeled vehicle integrally functions as a portion of said accommodating vehicle; and compacting said two-wheeled vehicle, wherein said two-wheeled vehicle includes a plurality of collapsible frames and said two-wheeled vehicle is loaded into a trunk space of the accommodating vehicle and a seat and a seat post function as a seat of said accommodating vehicle.

* * * * *